US012705954B2

(12) United States Patent
Ching et al.

(10) Patent No.: US 12,705,954 B2
(45) Date of Patent: Aug. 11, 2026

(54) STATE DETERMINED PERSISTENCE FEATURE SYSTEM AND METHOD

(71) Applicant: Aristocrat Technologies, Inc., Las Vegas, NV (US)

(72) Inventors: Erick Ching, Cedar Park, TX (US); Hanna Sanborn, Georgetown, TX (US); Jennifer Mizzi, Ewa Beach, HI (US); Nathan Warms, Austin, TX (US); Rogelio Decasa, Jr., Renton, WA (US); Zachary Smith, Austin, TX (US); Jeffrey Uss, Liberty Hill, TX (US); Kelly Lockheed, Elkridge, MD (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 542 days.

(21) Appl. No.: 17/956,317

(22) Filed: Sep. 29, 2022

(65) Prior Publication Data

US 2024/0112539 A1 Apr. 4, 2024

(51) Int. Cl.
*G07F 17/32* (2006.01)
*G06F 7/58* (2006.01)

(52) U.S. Cl.
CPC .......... *G07F 17/3267* (2013.01); *G06F 7/588* (2013.01); *G07F 17/3213* (2013.01); *G07F 17/3244* (2013.01)

(58) Field of Classification Search
CPC .. G07F 17/3267; G07F 17/34; G07F 17/3213; G07F 17/3244; G06F 7/588
See application file for complete search history.

(56) References Cited

U.S. PATENT DOCUMENTS 6,709,333 B1 * 3/2004 Bradford ................ G07F 17/32 463/29

* cited by examiner

*Primary Examiner* — Werner G Garner
(74) *Attorney, Agent, or Firm* — Armstrong Teasdale LLP

(57) ABSTRACT

A gaming system is provided. The gaming system may include a game display configured to display a game interface including a matrix having a plurality of rows including a plurality of matrix positions and a processor configured to determine a number of wild symbols currently displayed in the matrix, in response to determining the number of wild symbols currently displayed in the matrix exceeds a threshold number, determine a number of spin credits, in response to the number of spin credits being greater than zero, determine a weighting factor defining a probability for displaying a symbol in a respective matrix position, apply the determined weighting factors to respective lookup tables for each matrix position not currently displaying a wild symbol, and determine, for each matrix position not currently displaying a wild symbol, a symbol to display.

20 Claims, 22 Drawing Sheets

100
SERVER COMPUTERS
102
CENTRAL DETERMINATION GAMING SYSTEM SERVER
106
TITO SYSTEM SERVER
108
PLAYER TRACKING SYSTEM SERVER
110
PROGRESSIVE SYSTEM SERVER
112
CASINO MANAGEMENT SYSTEM SERVER
114
104A
104B
104C
104X 264b
274b
258
417
272
284a
280
278
286a
276
282a
264a
274a
258
270
284b
282b
286b
264c
274c
266

Figure 5:
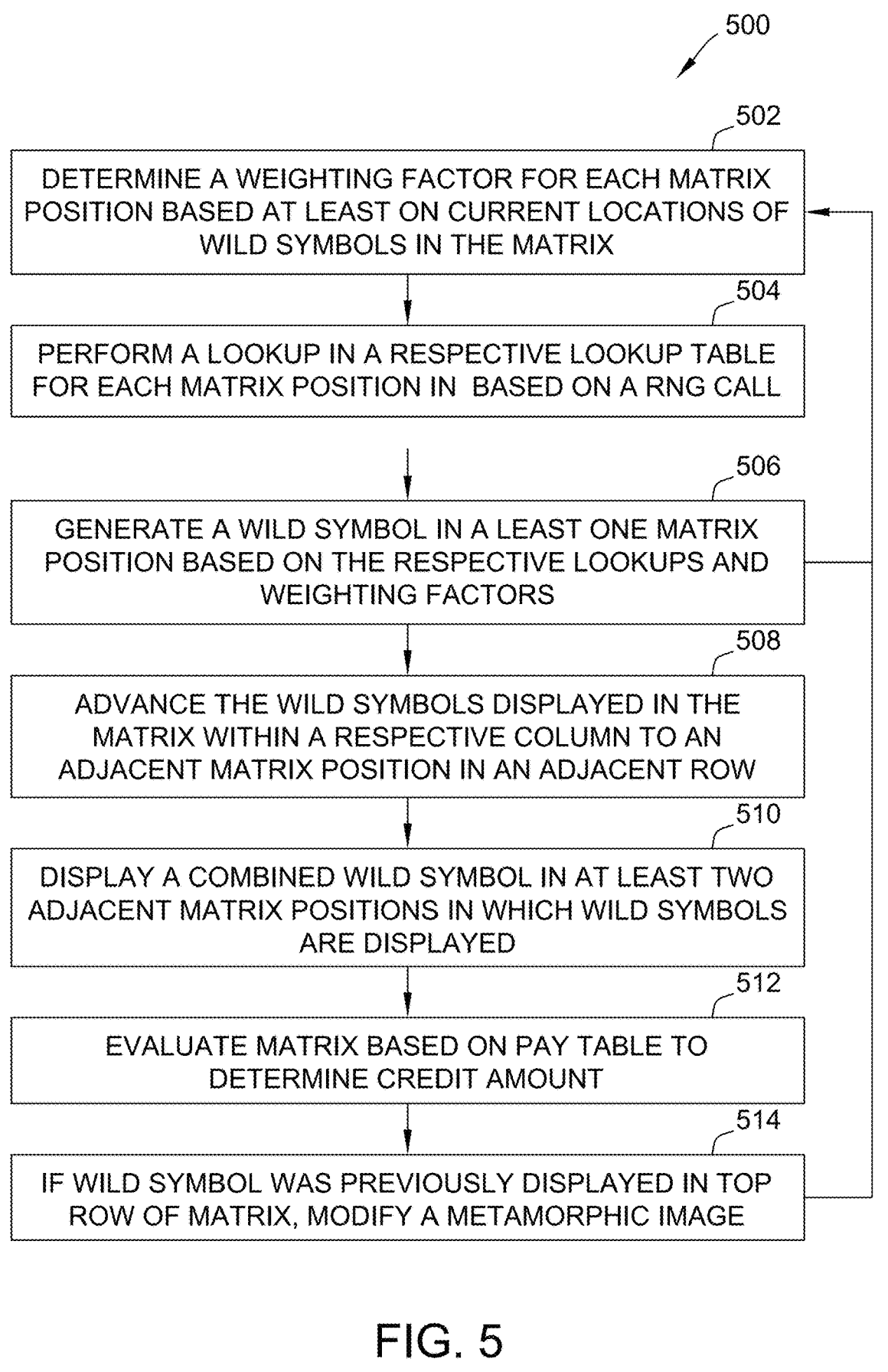

500

502 DETERMINE A WEIGHTING FACTOR FOR EACH MATRIX POSITION BASED AT LEAST ON CURRENT LOCATIONS OF WILD SYMBOLS IN THE MATRIX

504 PERFORM A LOOKUP IN A RESPECTIVE LOOKUP TABLE FOR EACH MATRIX POSITION IN BASED ON A RNG CALL

506 GENERATE A WILD SYMBOL IN A LEAST ONE MATRIX POSITION BASED ON THE RESPECTIVE LOOKUPS AND WEIGHTING FACTORS

508 ADVANCE THE WILD SYMBOLS DISPLAYED IN THE MATRIX WITHIN A RESPECTIVE COLUMN TO AN ADJACENT MATRIX POSITION IN AN ADJACENT ROW

510 DISPLAY A COMBINED WILD SYMBOL IN AT LEAST TWO ADJACENT MATRIX POSITIONS IN WHICH WILD SYMBOLS ARE DISPLAYED

512 EVALUATE MATRIX BASED ON PAY TABLE TO DETERMINE CREDIT AMOUNT

514 IF WILD SYMBOL WAS PREVIOUSLY DISPLAYED IN TOP ROW OF MATRIX, MODIFY A METAMORPHIC IMAGE

604 GRAND

604 MAJOR

604 MAXI

604 MINOR

604 MINI

602

| PICK ME | PICK ME | PICK ME | PICK ME | PICK ME |
|---|---|---|---|---|
| PICK ME | PICK ME | PICK ME | PICK ME | PICK ME |
| PICK ME | PICK ME | PICK ME | PICK ME | PICK ME |

604 GRAND

604 MAJOR

604 MAXI

604 MINOR

604 MINI

602

| MAXI | MINI | PICK ME | GRAND | PICK ME |
| --- | --- | --- | --- | --- |
| PICK ME | GRAND | PICK ME | MINOR | MINOR |
| MINOR | MINI | PICK ME | MAJOR | PICK ME |

604 GRAND

604 MAJOR

604 MAXI

604 MINOR

604 MINI

602

| MAXI | MINI | MAXI | GRAND | MAJOR |
| --- | --- | --- | --- | --- |
| MINI | GRAND | MAJOR | MINOR | MINOR |
| MINOR | MINI | MAXI | MAJOR | GRAND |

FIG. 6D

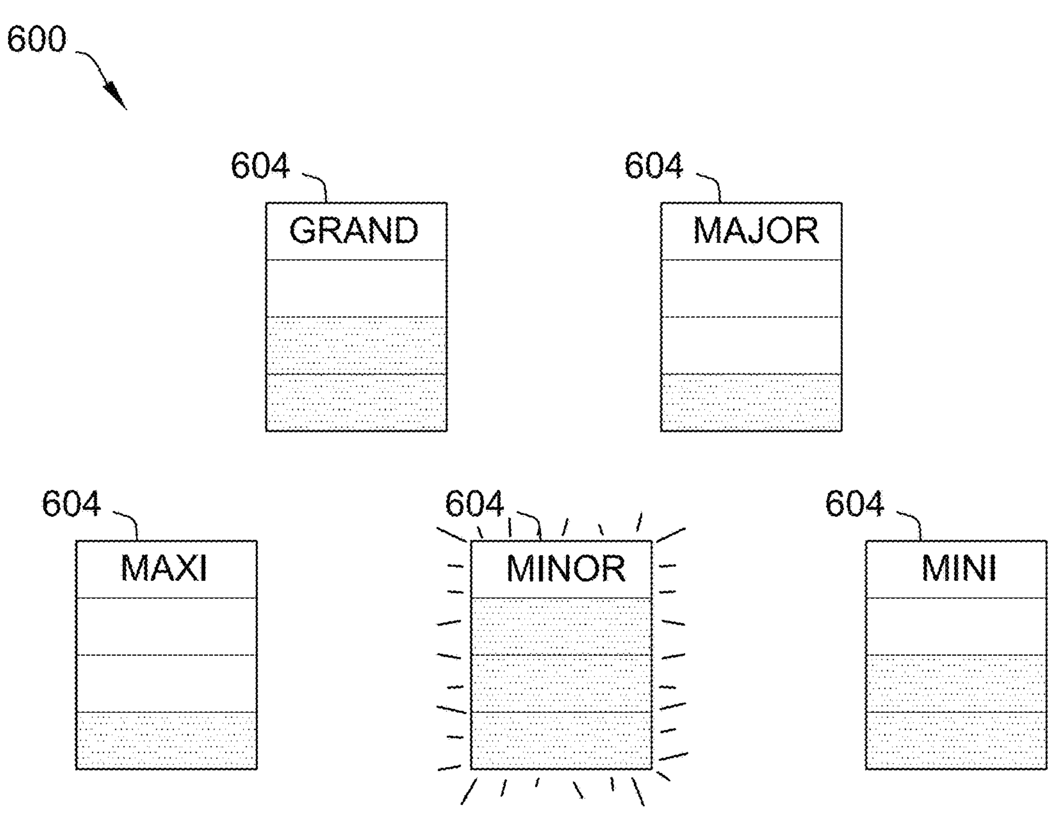
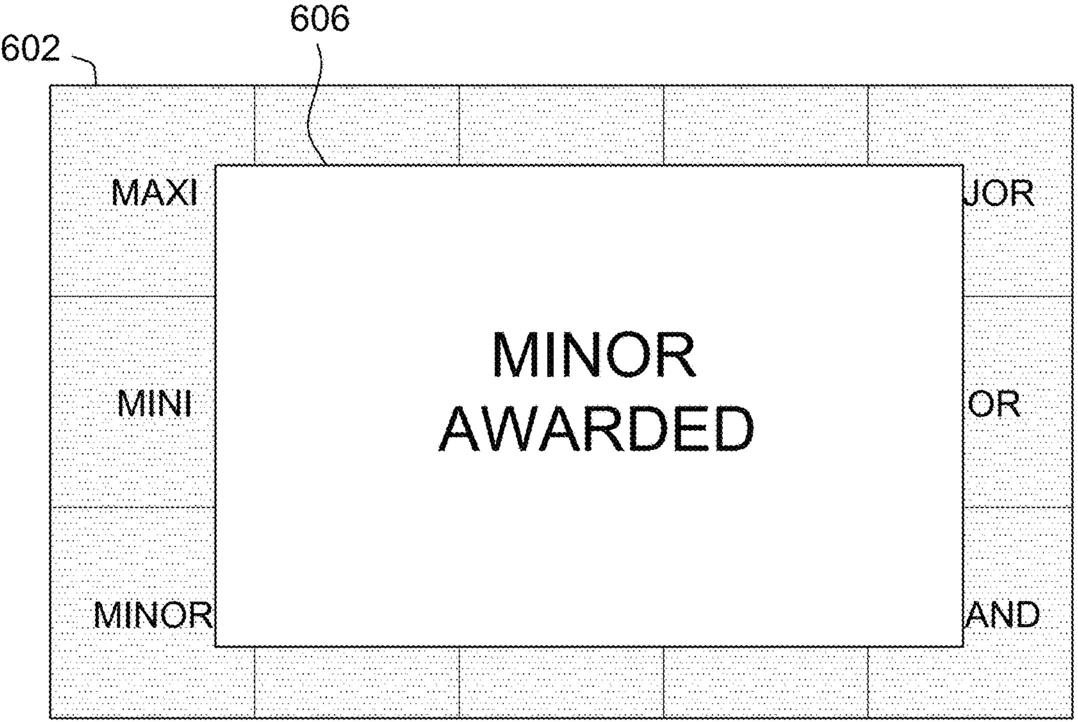
FIG. 6E

STATE DETERMINED PERSISTENCE FEATURE SYSTEM AND METHOD

TECHNICAL FIELD

The field of disclosure relates generally to electronic gaming, and more particularly, to a state-determined persistence feature in a gaming system wherein a function used to generate a display is determined based upon a previous state of the display.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, a gaming system is provided. The gaming system may include a game display configured to display a game interface including a matrix having a plurality of rows including a plurality of matrix positions. The gaming system may further include a memory device and a processor in communication with the game display and the memory device. The processor may be configured to determine a number of wild symbols currently displayed in the matrix, in response to determining the number of wild symbols currently displayed in the matrix exceeds a threshold number, determine a number of spin credits, in response to the number of spin credits being greater than zero, determine a weighting factor defining a probability for displaying a symbol in a respective matrix position, apply the determined weighting factors to respective lookup tables for each matrix position not currently displaying a wild symbol, and determine, for each matrix position not currently displaying a wild symbol, a symbol to display based on a respective lookup performed in the respective lookup tables and on at least one RNG output.

In another aspect, a method is provided. The method may be performed by a gaming system including a game display configured to display a game interface including a matrix having a plurality of rows including a plurality of matrix positions, a memory device, and a processor in communication with the game display and the memory device. The method may include determining a number of wild symbols currently displayed in the matrix, in response to determining the number of wild symbols currently displayed in the matrix exceeds a threshold number, determining a number of spin credits, in response to the number of spin credits being greater than zero, determining a weighting factor defining a probability for displaying a symbol in a respective matrix position, applying the determined weighting factors to respective lookup tables for each matrix position not currently displaying a wild symbol, and determining, for each matrix position not currently displaying a wild symbol, a symbol to display based on a respective lookup performed in the respective lookup tables and on at least one RNG output.

In another aspect, at least one non-transitory computer-readable media having computer-executable instructions embodied thereon may be provided. When executed by a processor in communication with a memory device and a game display configured to display a game interface including a matrix having a plurality of rows including a plurality of matrix positions, the computer-executable instructions may cause the processor to determine a number of wild symbols currently displayed in the matrix, in response to determining the number of wild symbols currently displayed in the matrix exceeds a threshold number, determine a number of spin credits, in response to the number of spin credits being greater than zero, determine a weighting factor defining a probability for displaying a symbol in a respective matrix position, apply the determined weighting factors to respective lookup tables for each matrix position not currently displaying a wild symbol, and determine, for each matrix position not currently displaying a wild symbol, a symbol to display based on a respective lookup performed in the respective lookup tables and on at least one RNG output.

BRIEF DESCRIPTION OF THE DRAWINGS

FIG. 5 is a flowchart illustrating an example process for state-determined persistence feature for the system shown in FIG. 1.

FIGS. 6A-6E illustrate another example game display shown on a gaming device such as those shown in FIG. 1.

DETAILED DESCRIPTION

Figure 1:
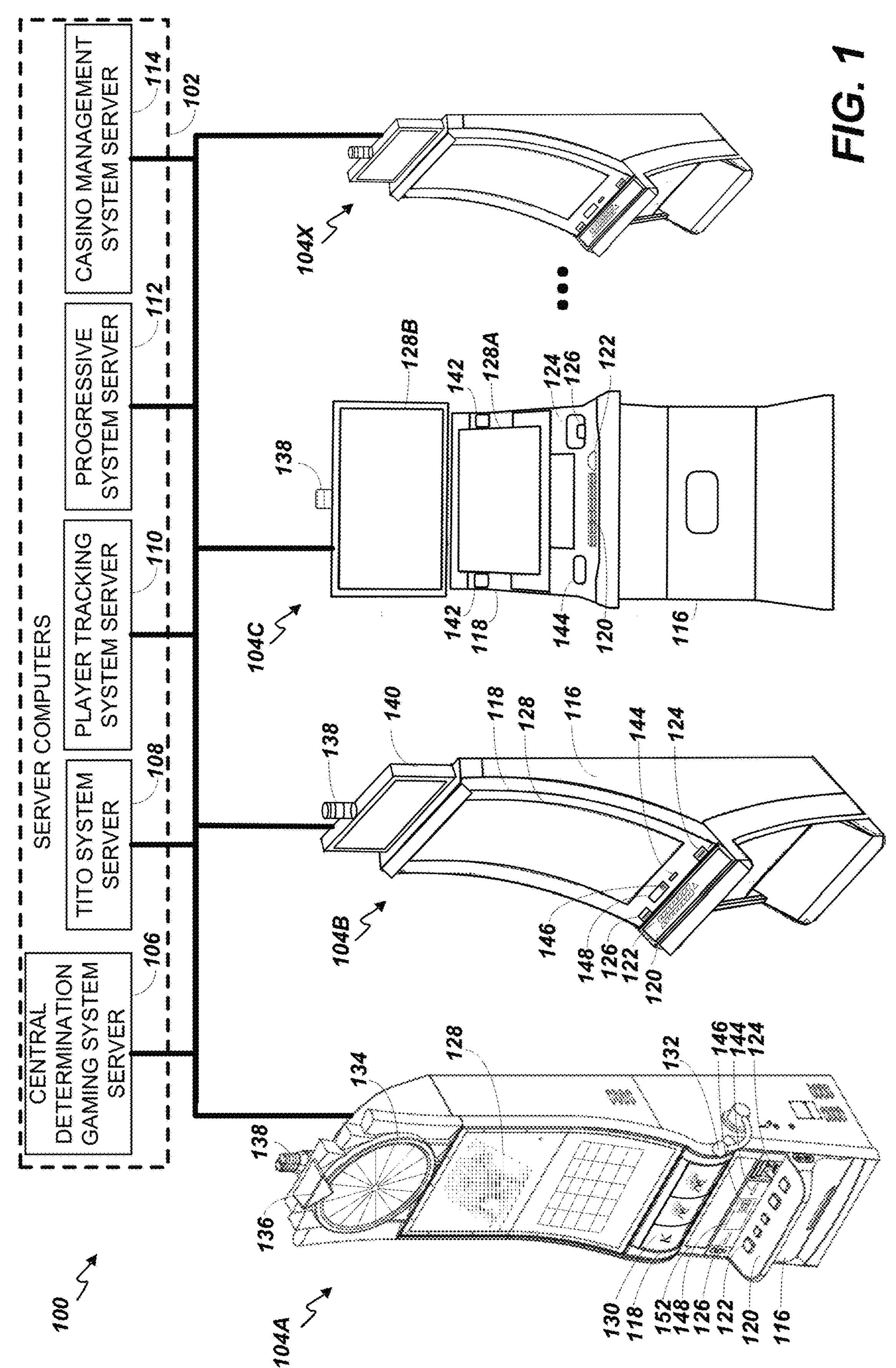
FIG. 1 is an exemplary diagram showing several gaming machines networked with various gaming related servers.

The systems and methods described herein include a gaming device that operates and/or is configured to implement a persistence feature. In the example embodiment, the systems and methods may include a game display configured to display a matrix having a plurality of rows and a plurality of columns defining a plurality of matrix positions. In the example embodiment, the persistence feature may include displaying symbols in respective matrix positions of the matrix. The symbols may be "persistent," in that they may be displayed through multiple game instances of the persistence feature.

The persistence feature may include generating and displaying "wild symbols," in respective matrix positions, which may be used to complete patterns defined in a pay table that, when displayed, may result a credit amount being credited to a user. Because many wild symbols may be displayed in the matrix, increasing a likelihood of a relatively large credit award occurring, it is desirable for game operators to control RTP of the persistence feature. However, certain methods for controlling RTP, such as using different lookup tables (e.g., associated with different probabilities for displaying wild symbols) based on how many wild symbols are already displayed, may have large memory storage requirements and may be computationally expensive. Accordingly, a technical problem exists in controlling RTP while reducing memory storage and processing power use. As described in further detail below, the systems and methods described herein solve this technical problem by applying weighting factors that may change or define a probability of additional wild symbols being generated, and the locations in which the wild symbols are generated, based on a current state of the matrix, for example, how many wild symbols are currently displayed and/or their locations within the matrix. In other words, using weighting factors, the probability of generating wild symbols and the locations in which they are generated (e.g., within the matrix as a whole and/or with respect to the locations of other wild symbols) may be adjusted without a need for using separate lookup tables, which may reduce memory storage requirements and/or increase computational efficiency.

In the example embodiment, when a threshold number of wild symbols are displayed, an additional game feature, referred to herein as a "respin" feature, may be triggered, in which additional wild symbols may be generated in any matrix position not already displaying a wild symbol. The respin feature may be performed separately from the base game for a certain number of game instances. During each game instance of the respin feature, a separate evaluation may be performed for each matrix position to determine whether to generate a new wild symbol in that matrix position. This evaluation may include performing a lookup in a respective lookup table for each matrix position based on an RNG output. Similar to the evaluation performed within the base game, weighting factors may be applied to the respective lookup tables that define a probability of displaying a new wild symbol for each position. For example, if a greater number of wild symbols are currently displayed, a weighting factor that reduces a likelihood of additional wild symbols being displayed may be applied to the lookup tables. This weighting may be determined separately for each matrix position being evaluated. For example, a lookup table may be weighted based on how many wild symbols are displayed in the corresponding row and/or column of the matrix. Accordingly, an RTP of the persistence feature may be controlled in part based on the weighting factors.

In the example embodiment, the wild symbols may be generated in a particular row (e.g., a bottom row) of the matrix by performing one or more RNG calls and performing a respective lookup in one or more lookup tables based on the RNG calls to determine whether to display a wild symbol in a particular position. For example, each column may be associated with a different lookup table, and separate lookup for each matrix position in the row may be performed based on the corresponding lookup table to determine whether to display a wild symbol. In some embodiments, each column or lookup table may be associated with a different probability of displaying a wild symbol. The determination to generate wild symbols may be further, or alternatively, based on the weighting factor. The weighting factor may be a number that defines or relates to a probability, or an increase or decrease with respect to a base probability, of generating a wild symbol for a given matrix position. For each game instance, the weighting factors may be determined, for each matrix position or column, based on a current state of matrix (e.g., the number or locations of currently displayed wild symbols). For example, the weighting factors may be determined based on which matrix positions of the bottom row currently display a wild symbol (that was generated the previous game instance). In some embodiments, if a greater number of wild symbols are currently displayed in the matrix or in a particular row (e.g., the bottom row), one or more weighting factors may be selected that, for example, reduce a chance of a new wild symbols being generated. In some embodiments, if a wild symbol has recently (e.g., in the previous game instance or within a certain number of previous game instances or a previous turn) been generated in a particular column, a weighting factor may be selected for that column that reduces a chance of a new wild symbol being generated in that column. Because weighting factors require less memory storage and computational power than using multiple lookup tables, the weighting factors enable RTP to be controlled with more efficient use of memory storage and/or computer processing power.

In the example embodiment, when wild symbols are displayed adjacently, the wild symbols may be combined into a single, combined wild symbol that covers multiple matrix positions. The combined wild symbol may have an associated multiplier that may be applied to any credit awarded for a particular game instance. The multiplier may correspond, for example, to a size or number of matrix positions covered by the combined wild symbol (e.g., 2× if two matrix positions or covered and/or 6× if six matrix positions are covered. Accordingly, an additional technical problems exist relating to combination of wild symbols.

Specifically, because a larger number of combinations may result in a large number of multipliers, a desired RTP should be maintained without using a large amount of additional memory storage and/or processing power. The systems and methods solve these technical problems by applying rules that determine when combinations of wild symbols should be made. For example, the wild symbols may be combined in a way that reduces a total number of combined wild symbols displayed (e.g., displaying one combined wild symbol over six matrix positions with a 6× multiplier rather than displaying three combined wild symbols each over two matrix positions with a 2× multiplier), which may reduce to total multiplier for a given game instance, providing an additional way for controlling RTP while reducing additional need for memory storage and/or processing requirements.

In the example embodiment, the game display may further include a feature referred to herein as a "metamorphic image." For example, with each game instance, the wild symbols may change position, for example, by moving to a matrix position adjacent to (e.g., above) their current matrix position. When wild symbols reach the top of the matrix, they may be removed from the display. When a wild symbol is removed from the display as such, the metamorphic image may be modified. For example, in some embodiments, each wild symbol may include a dinosaur icon, and when a wild symbol is removed due to reaching the top of the matrix, the metamorphic image may be modified, for example, to include an additional dinosaur. In such embodiments, the display may include an animation of the dinosaur icon moving from the matrix to the metamorphic image. In response to at least one of the wild symbols reaching the top of the matrix, additional game features (e.g., jackpots and/or bonus games) may be triggered. For example, once at least a threshold number (e.g., one) of wild symbols has reached the top of the matrix, a bonus RNG call may be enabled for each game instance, based on which the additional features may be triggered. The probability of triggering the additional features may remain constant once enabled, or may change (e.g., increase) as additional wild symbols reach the top of the matrix.

Additionally, further technical benefits are realized based upon the present disclosure. For example, a plurality of random determinations may be made (e.g., via a plurality of RNG outcomes and/or a plurality of lookup tables) in order to determine not only one or more game outcomes but also one or more display features. For example, the display of wild symbols, combined wild symbols, animations, other game symbols, and metamorphic images may be randomly determined (e.g., using an RNG call and an associated lookup table). The amount of random determinations possible in embodiments described herein result in an increased variety of possible game outcomes to be provided and therefore an improved game as it is less likely any outcomes would be repeated (e.g., displayed in the same manner).

Certain display benefits are also realized herein as technical benefits achieved by the present disclosure (e.g., because certain technical problems arise when trying to communicate/display a significant amount of information on a screen of limited size). For example, as explained herein, in some embodiments, animations may be displayed during the persistent feature, such as movement or progression of wild symbols within the matrix, modification to the metamorphic image, reel spins, or other animations indicating the triggering of in-game features or awards. Accordingly, the present disclosure provides a variety of improvements in communicating information to a player in a limited amount of display space/real estate—thereby providing an improved interface.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
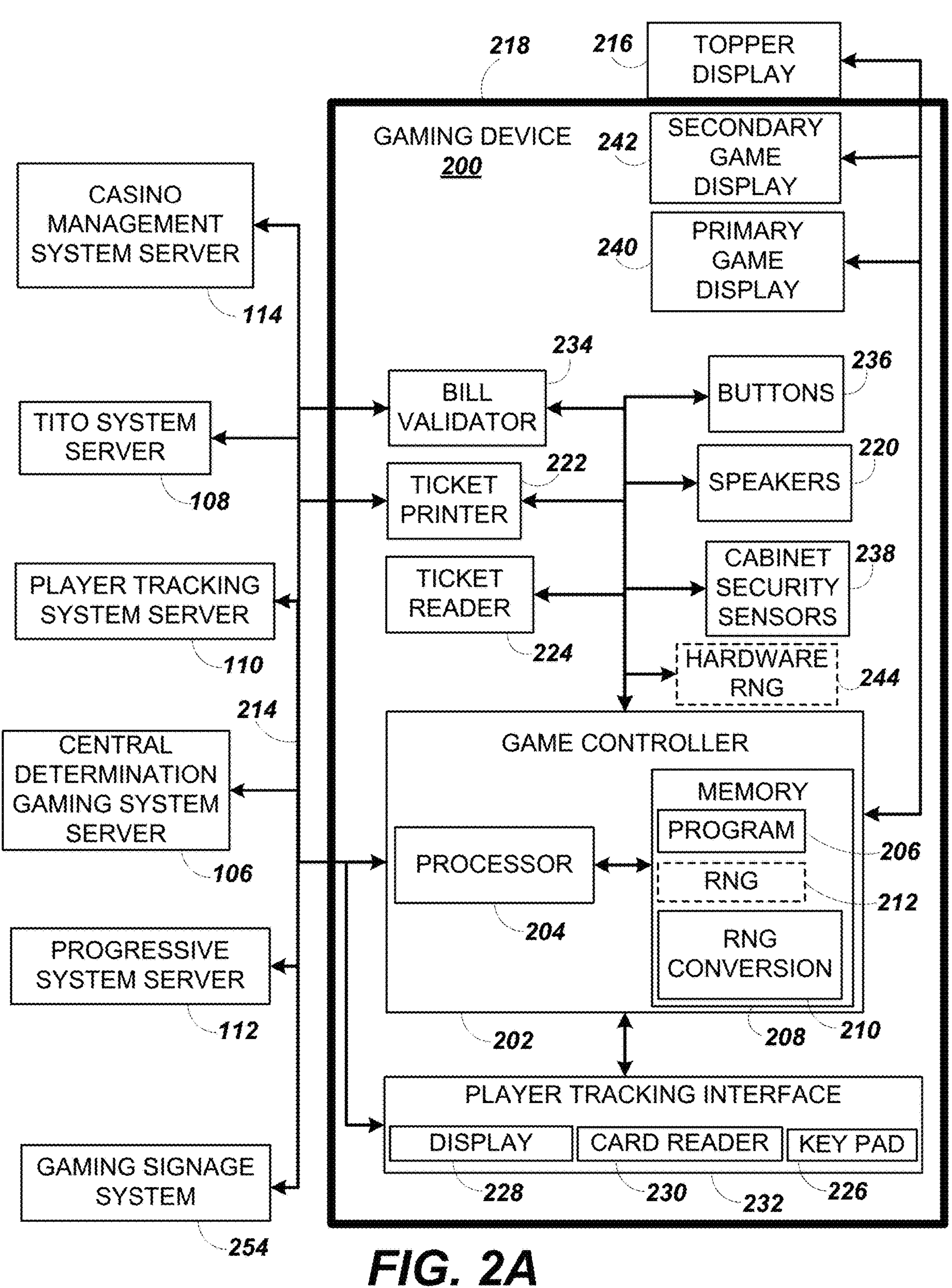
FIG. 2A is a block diagram showing various functional elements of an exemplary gaming machine.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218.

Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
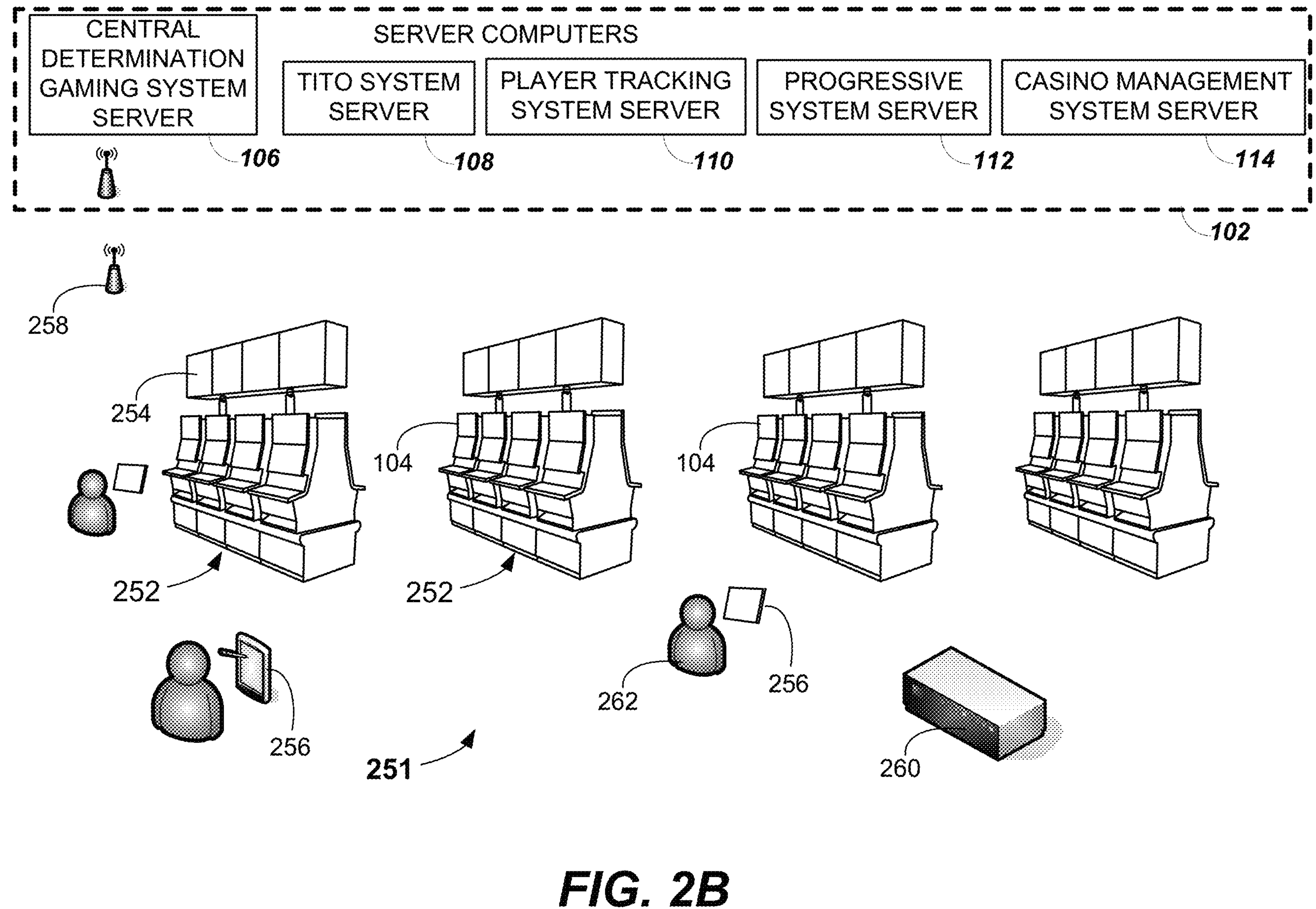
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
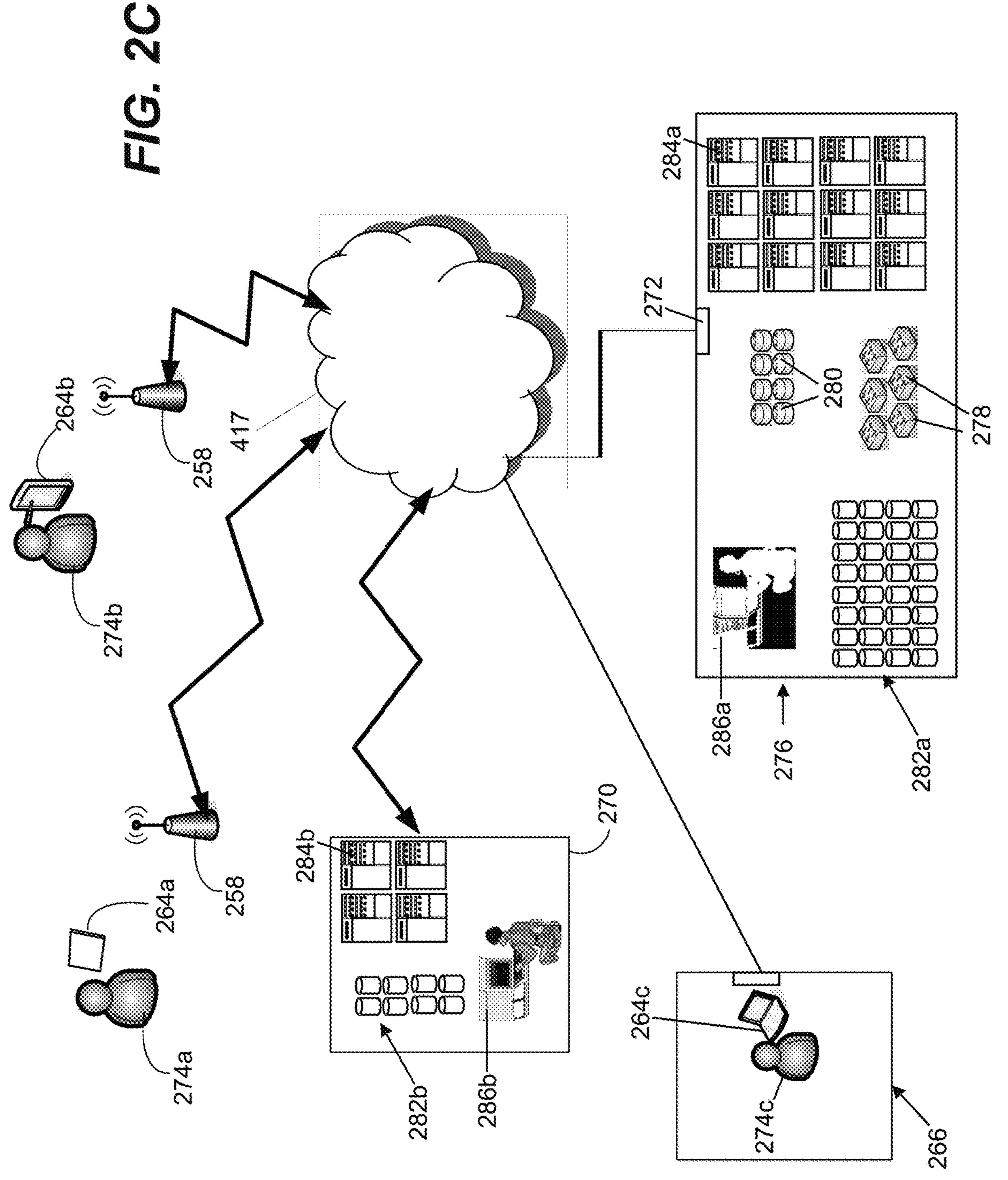
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*b*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
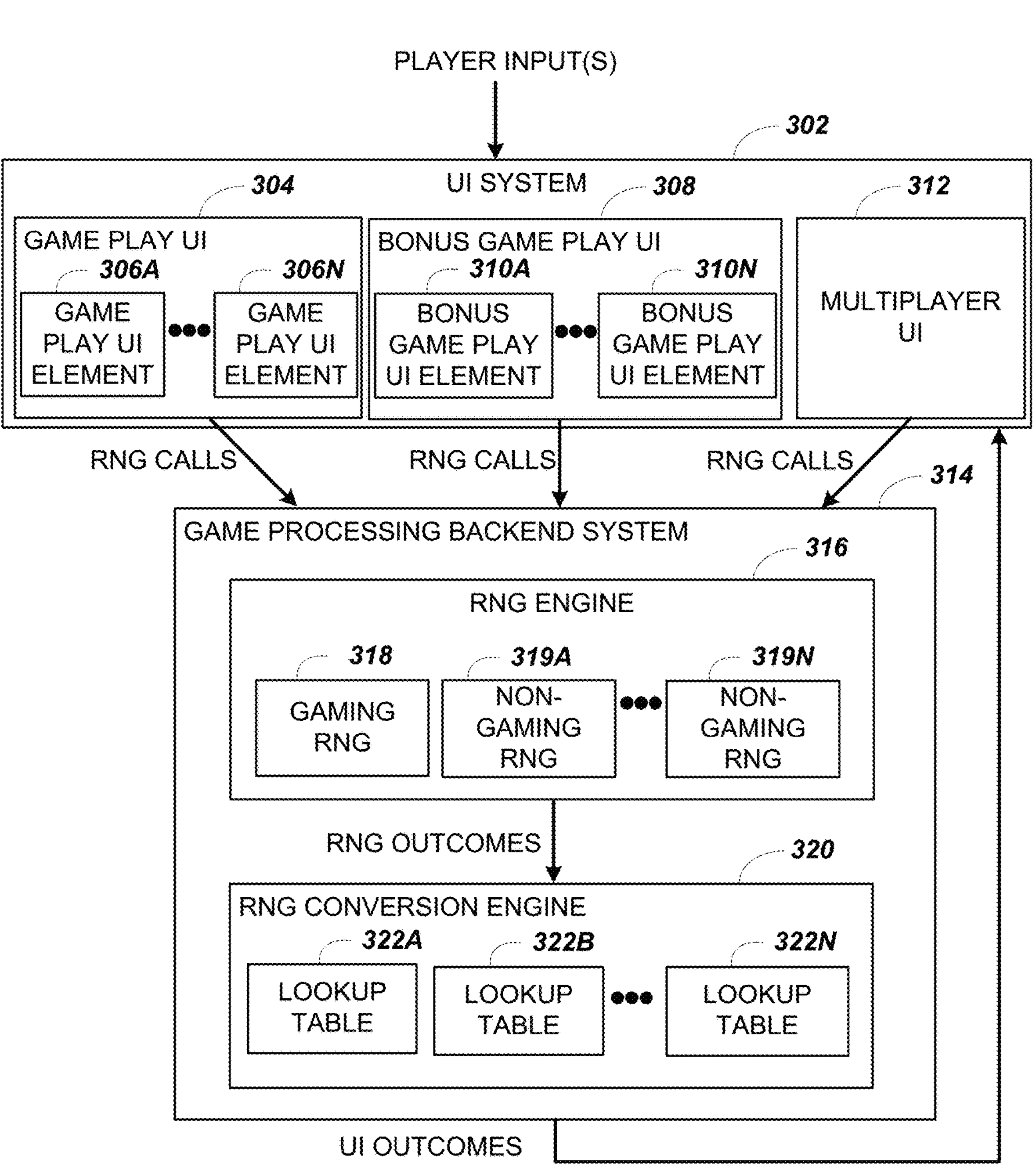
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical “spin” button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

FIGS. 4A-4K depict an example game interface 400, which may be displayed by, for example, gaming devices 104A-104X and/or mobile gaming devices 256 to present, for example, a base game having a persistence feature and a respin feature. Game interface 400 may include a matrix 402 having a plurality of rows 404 and a plurality of columns 406 defining a plurality of matrix positions. FIGS.

4A-4K depict matrix 402 as having four rows 404, five columns 406, and twenty matrix positions; however, in other example embodiments, matrix 402 may have a different number of rows 404, columns 406, and/or matrix positions. Each of the matrix positions may display a symbol, as described in further details below.

Within a base game, certain game symbols (e.g., J, Q, K, A, T, PIC 1, PIC 2, and PIC 3 as shown in FIGS. 4A-4K) may be displayed in respective matrix positions of matrix 402 based on, for example, an evaluation of one or more lookup tables based on an RNG call. The pattern of displayed symbols may be analyzed by comparing the pattern to a pay table to determine if any winning conditions have been met, which may result in the user being awarded credits or another prize. In some embodiments, certain patterns may trigger the persistence feature.

During the base game, as described in further detail below, one or more "wild symbols" 408 (shown in FIGS. 4A-4K as including a dinosaur icon) may be displayed in respective matrix positions of matrix 402. As shown, for example, in FIGS. 4A and 4B, wild symbols 408 progress or advance (e.g., upward) through matrix 402 for each game instance of the base game. In other words, for each game instance, a wild symbol 408 is displayed in a matrix position adjacent to (e.g., the matrix position in the next row 404 of the same column 406) matrix positions where wild symbols 408 were previously displayed, and the previously displayed wild symbols 408 are removed from the matrix. As described in further detail below, for each game instance of the base game, the current pattern of game symbols and wild symbols 408 may be analyzed with respect to a pay table, and the user may receive credit based on the analysis. During this analysis, wild symbols 408 may be treated as substitutes that may serve in place of other symbols for completing winning patterns. Accordingly, the display of wild symbols 408 generally increases a likelihood of the user being awarded credits within the base game.

Wild symbols 408 may be generated in a particular row 404 (e.g., a bottom or first row 404) by performing one or more RNG calls and performing a respective lookup in one or more lookup tables based on the RNG calls to determine whether to display a wild symbol 408 in a particular position. For example, each column 406 may be associated with a different lookup table, and separate lookup for each matrix position of the first row 404 may be performed based on the corresponding lookup table to determine whether to display a wild symbol 408. In some embodiments, each column 406 or lookup table may be associated with a different probability of displaying a wild symbol 408. The probability associated with each column may be selected to achieve, for example, a desired RTP and/or a desired variation in game display or award outcomes.

The determination to generate wild symbols 408 may be further based on a weighting factor. The weighting factor may be a number that defines or relates to a probability, or an increase or decrease with respect to a base probability, of generating a wild symbol 408. For each game instance, the weighting factors may be determined, for each column 406, based on a current state of matrix 402. For example, the weighting factors may be determined based on any combination of a total number of wild symbols 408 currently displayed, locations (e.g., rows 404 and/or columns 406) where wild symbols 408 are currently displayed, and/or a current location of other game symbols within matrix 402. In some embodiments, if a greater number of wild symbols 408 are currently displayed in matrix 402, a weighting factor may be selected (e.g., for each column 406) that reduces a chance of a new wild symbol 408 being generated. In some embodiments, if a wild symbol 408 has recently (e.g., within a last certain number of game instances) been generated in a particular column 406, a weighting factor may be selected for that column 406 that reduces a chance of a new wild symbol 408 being generated in that column. Accordingly, because displaying a greater number of wild symbols 408 may result in increased awarding of credits to the user as described above, the weighting factor may be selected to control RTP by selecting a probability that additional wild symbols 408 will be displayed when other wild symbols 408 are already displayed without a need for storing multiple lookup tables. Accordingly, the weighting factors enable RTP to be controlled with more efficient use of memory storage and/or computer processing power.

Figure 4A:
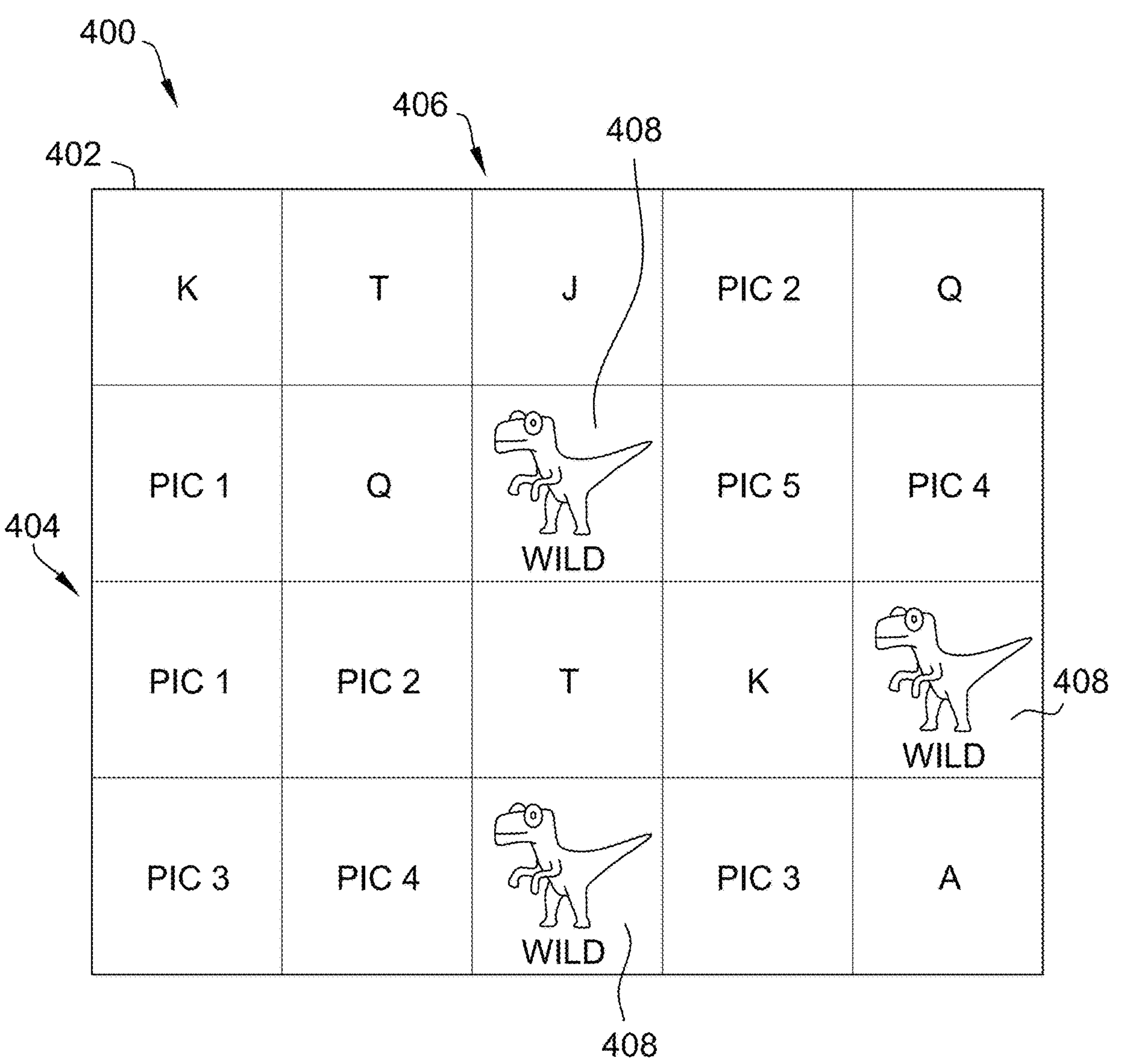
FIGS. 4A-4K illustrate an example game display shown on a gaming device such as those shown in FIG. 1.
Figure 4B:
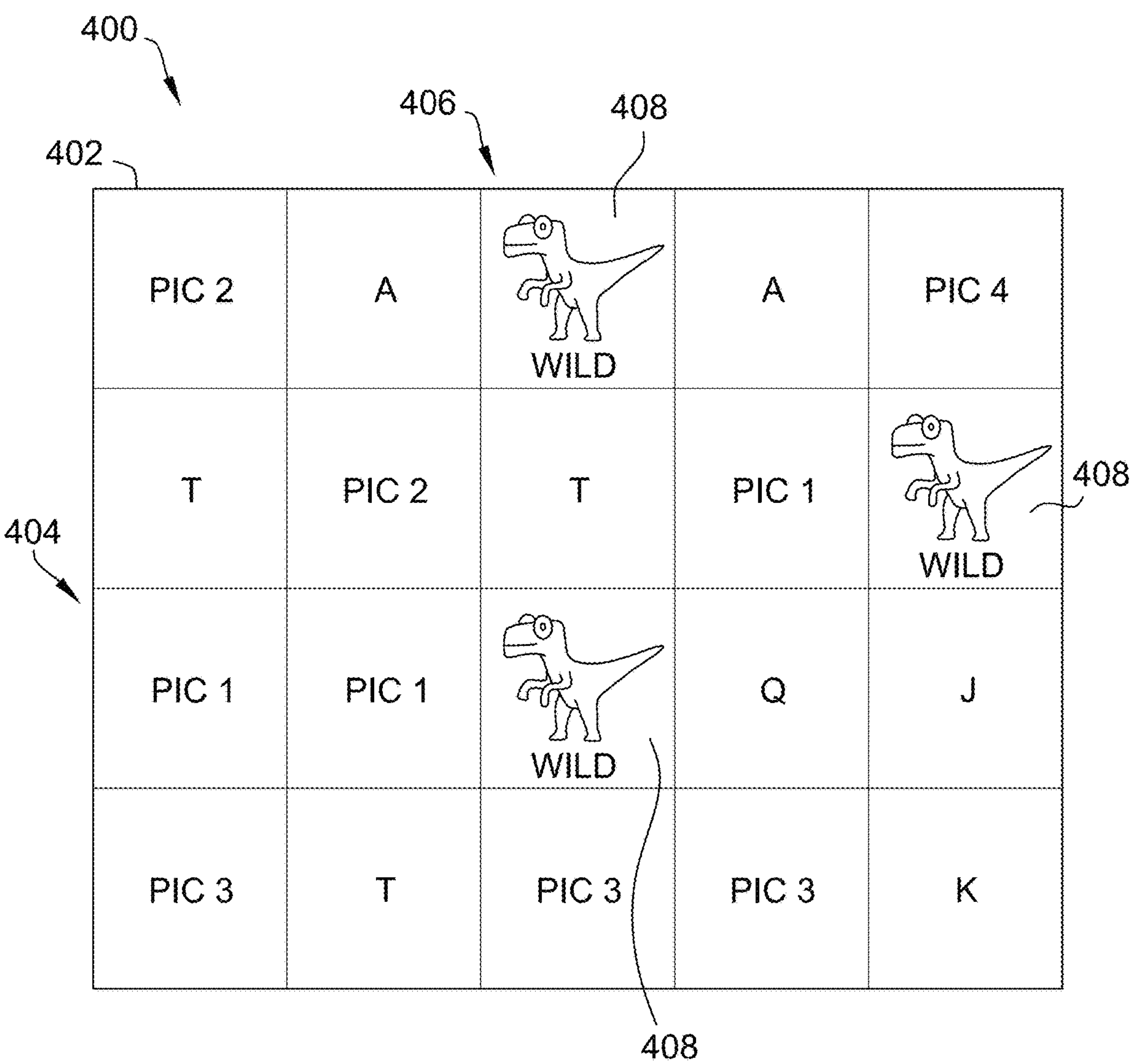
Figure 4C:
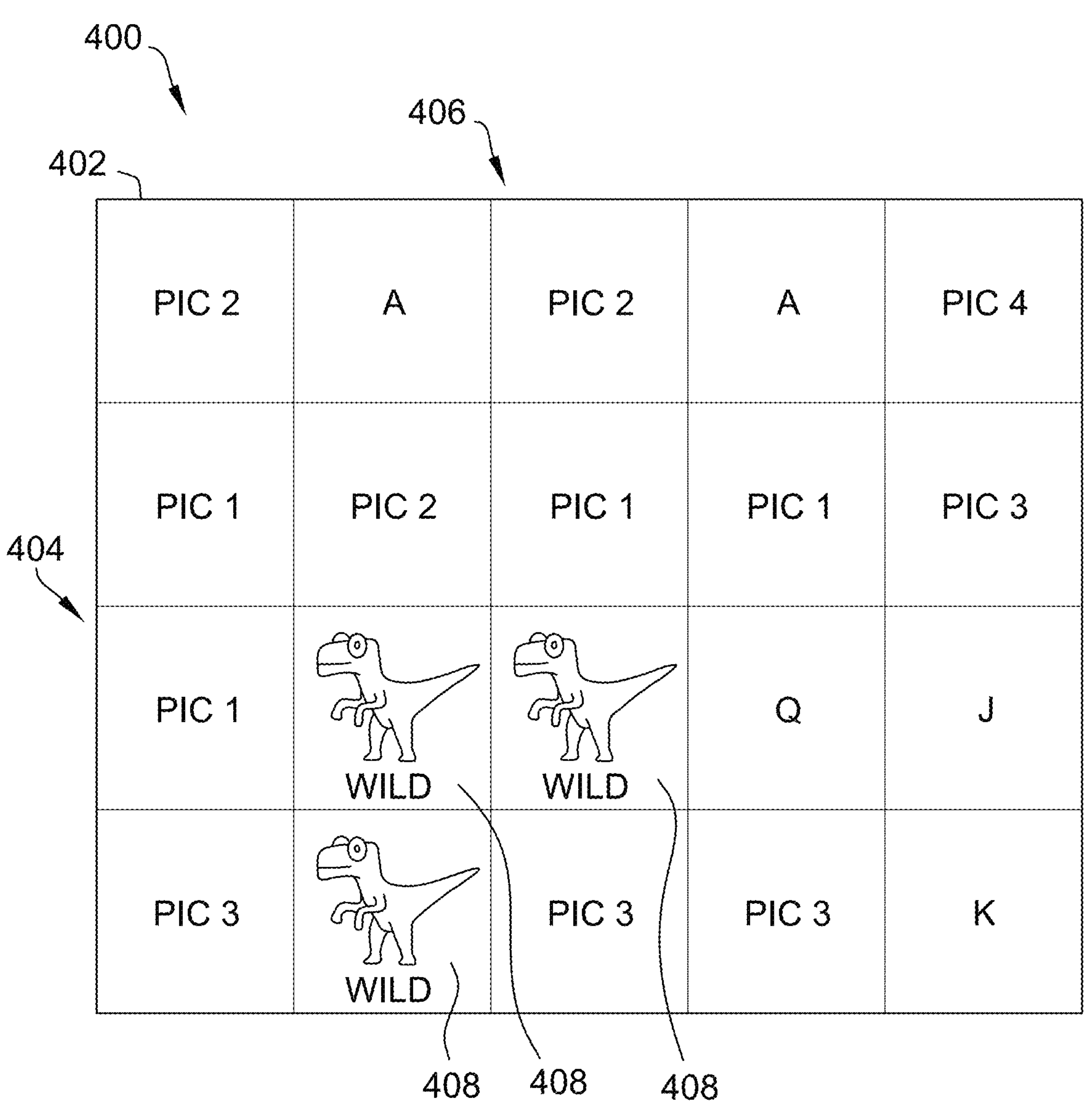
Figure 4D:
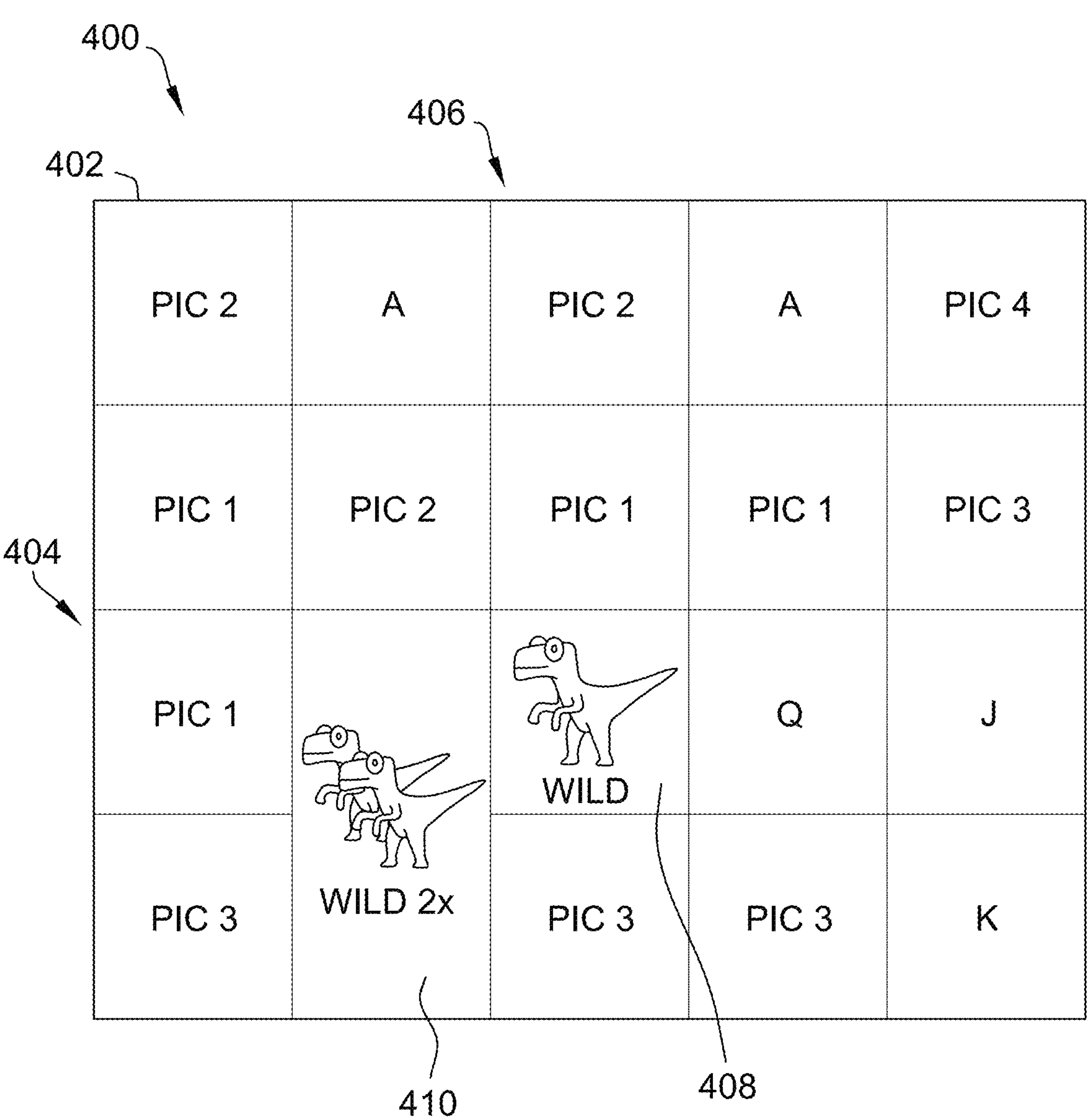

In some embodiments, when a plurality of (i.e., at least two) wild symbols 408 are displayed in adjacent matrix positions during the base game, the adjacent wild symbols 408 may be combined into a single combined wild symbol 410 that covers multiple matrix positions. For example, as shown in FIGS. 4C and 4D, two adjacent wild symbols 408 may be combined into a combined wild symbol 410 that covers two matrix positions. In another example, as shown in FIGS. 4G and 4H, six adjacent wild symbols 408 may be combined into a combined wild symbol 410 that covers six matrix positions. Because there may be multiple possible ways to combine wild symbols 408 (e.g., as shown in FIGS. 4C and 4G), certain rules may be applied to determine which wild symbols 408 are combined. For example, the rules may require that only rectangular combinations of wild symbols 408 be combined. The rules may further prioritize generating the largest possible combined wild symbol 410 before generating smaller symbols. Each combined wild symbol 410 may be associated with a multiplier, which may be applied to any credit awarded to the user in response to a game instance. The multiplier may be correspond to the size of the combined wild symbol 410 (e.g., a 2× multiplier for a combined wild symbol 410 covering two matrix positions or a 6× multiplier for a combined wild symbol 410 covering six matrix positions), or may be determined in a different way (e.g., randomly). Accordingly, the rules may be selected to control RTP, for example, by reducing the total number of multipliers generated. For example, as shown in FIG. 4H, one combined wild symbol 410 associated with a 6× multiplier may be generated rather than, for example, three combined wild symbols 410 each with a 2× multiplier. In some embodiments, the evaluation of which wild symbols 408 to combined may be performed for each game instance based on the current display of wild symbols 408, for example, to account for wild symbols 408 that have been removed from or newly generated within matrix 402.

Figure 4E:
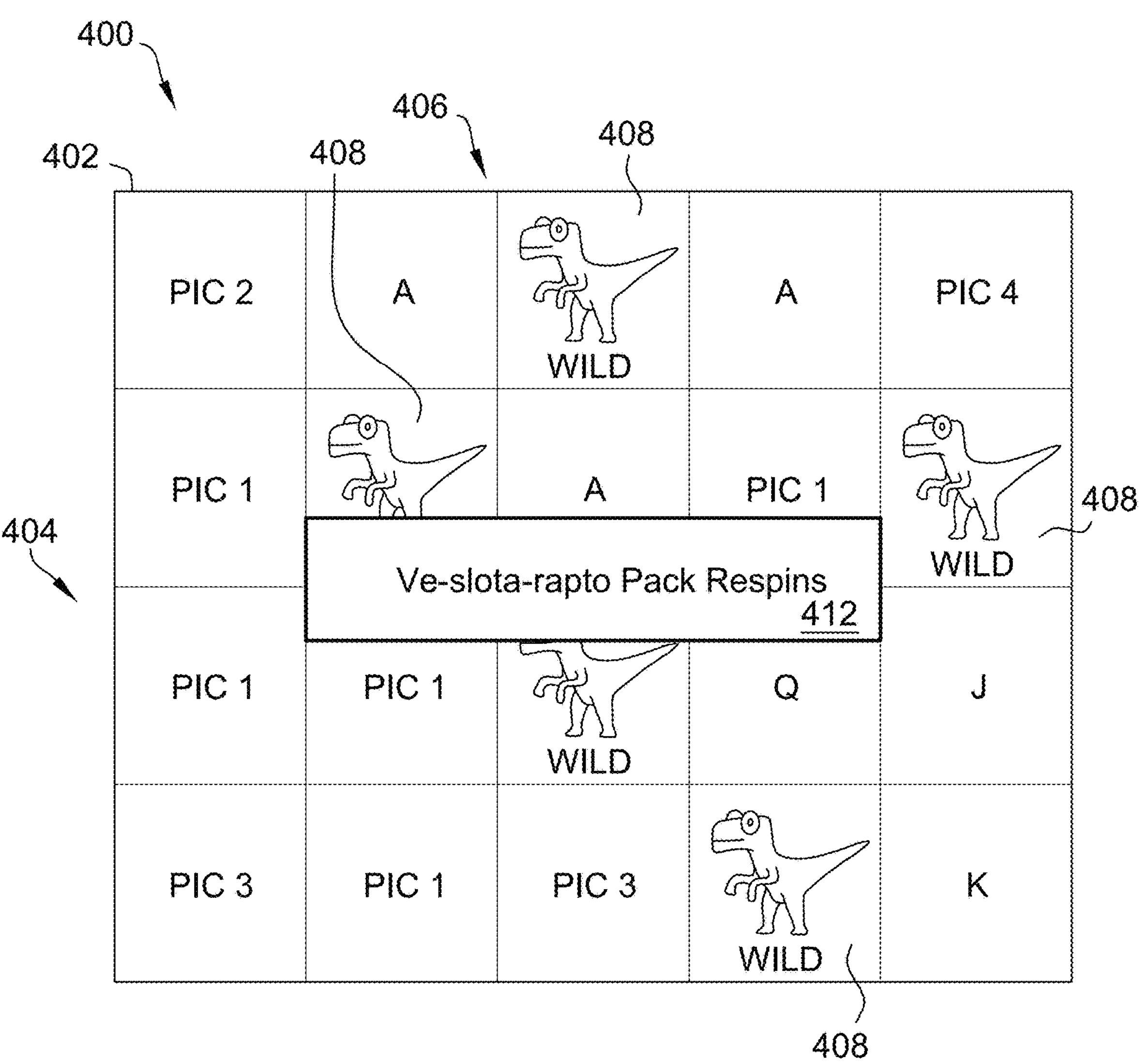
Figure 4F:
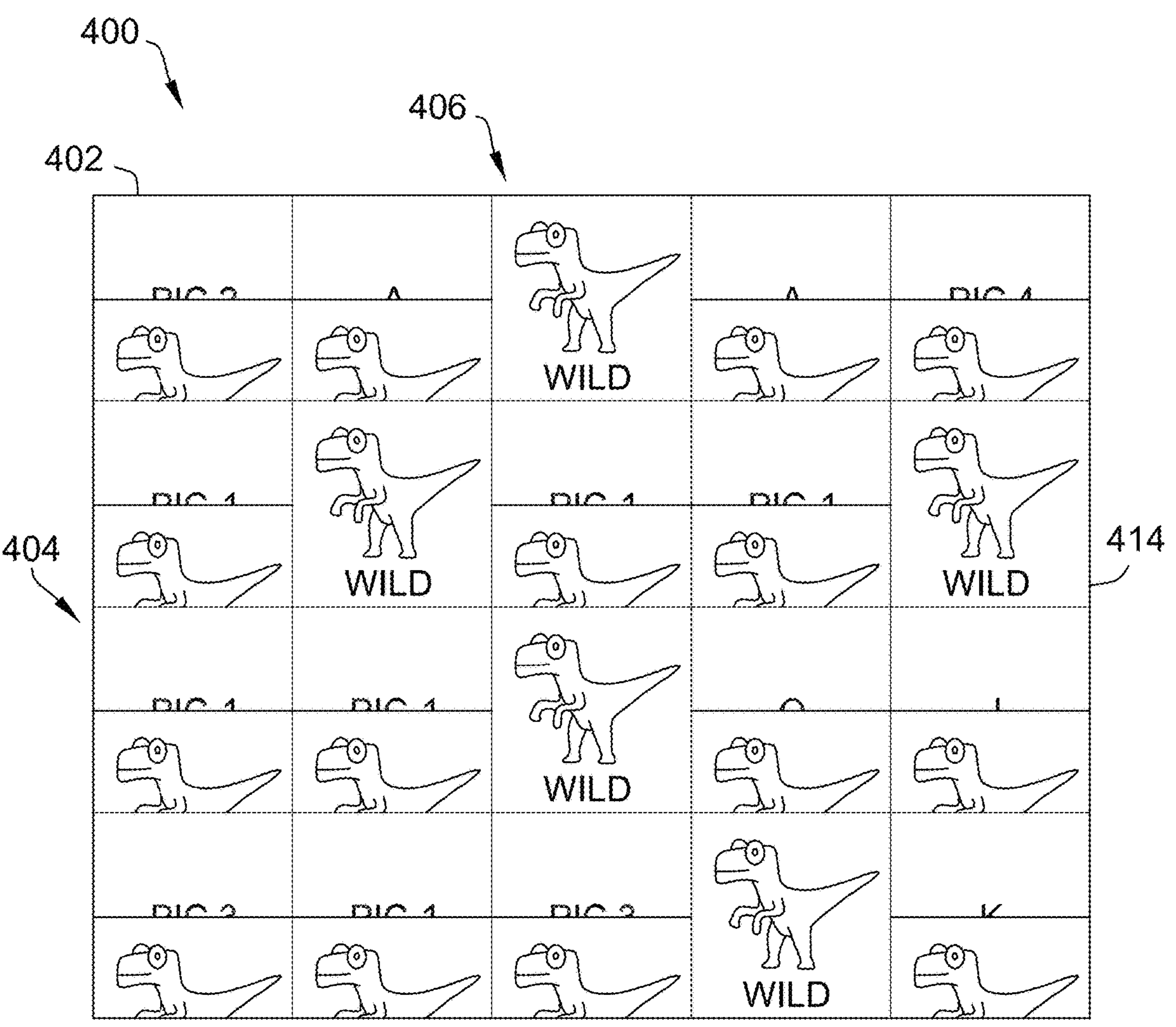
Figure 4G:
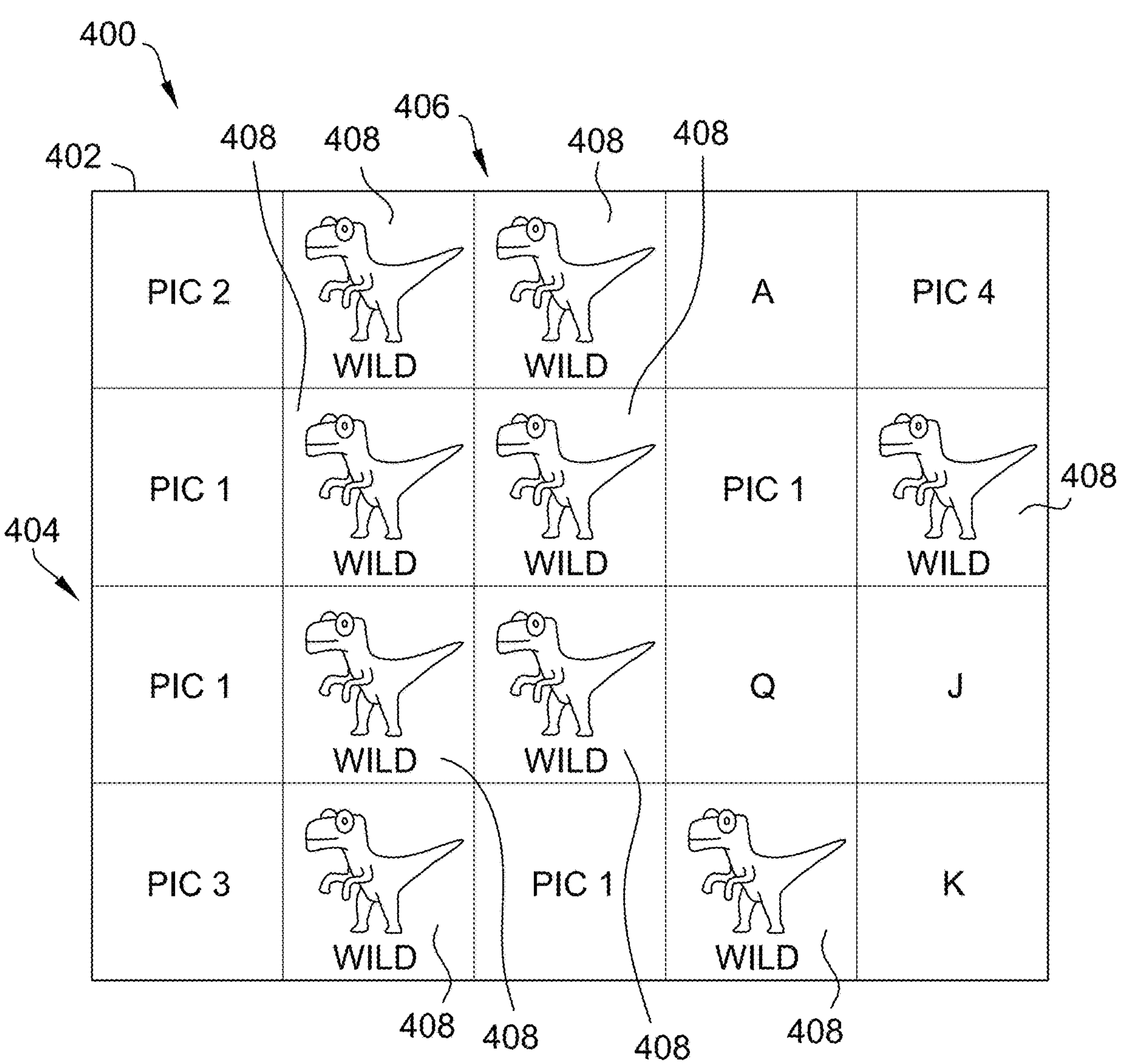
Figure 4H:
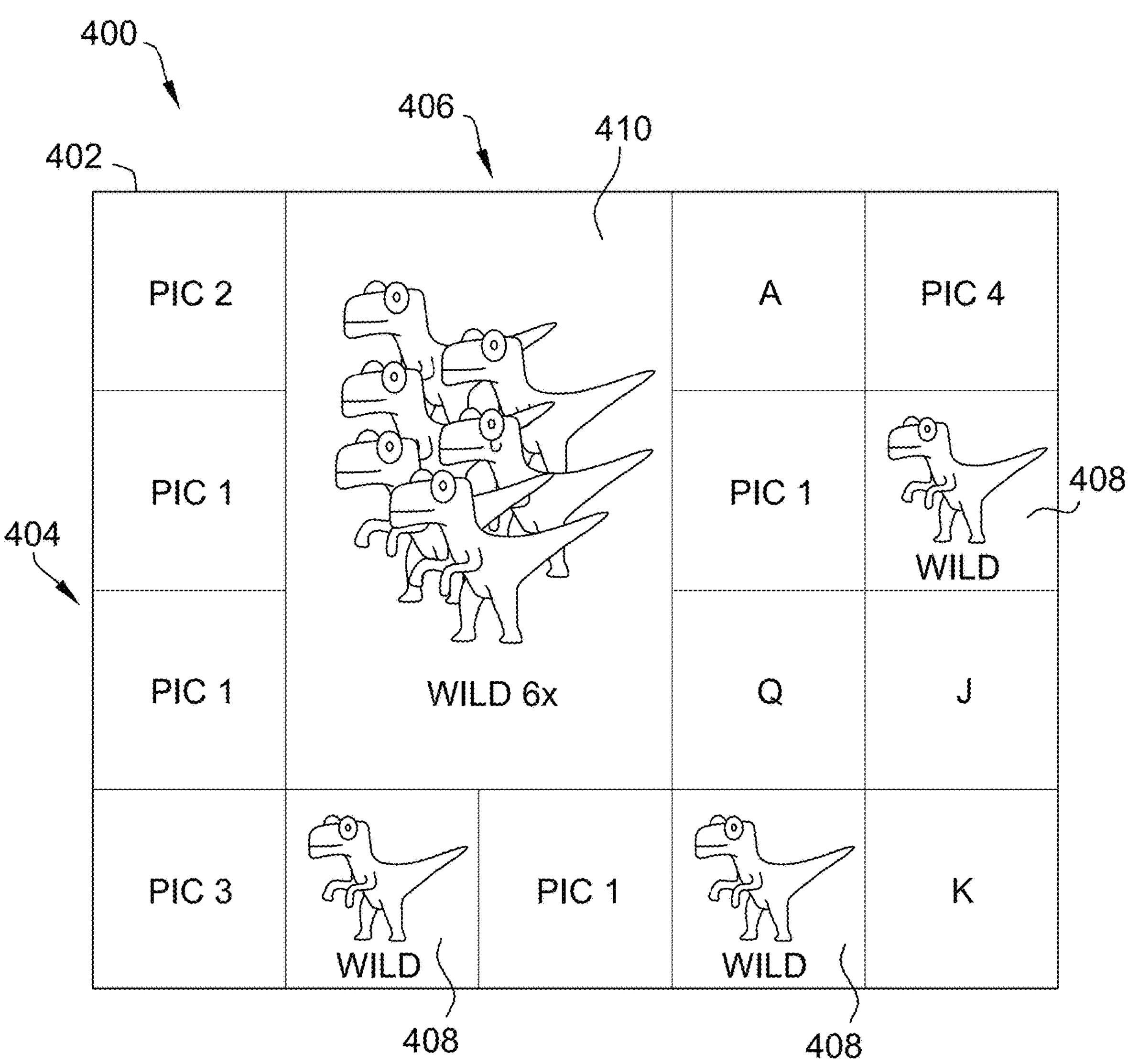

As shown in FIGS. 4E and 4F, in some embodiments, if a threshold number (e.g., five) of wild symbols 408 are displayed, or a threshold number of matrix positions are covered by wild symbols 408 and/or combined wild symbols 410, a respin feature may be triggered. The respin feature may be performed separately from the base game, and may occur a set number of instances (e.g., three instances), the number of which may be predefined or randomly determined. Wild symbols 408 and/or combined wild symbols 410 that are displayed at the initialization of the respin feature may remain displayed in their respective matrix positions throughout a duration of the respin feature. In some embodiments, as shown in FIG. 4E, a respin feature indicator 412 may be displayed to notify the user that the respin feature has initiated.

For each game instance of the respin feature, each matrix position of matrix 402 that currently does not display a wild symbol 408 and/or combined wild symbols 410 may be evaluated to determine whether to generate a new wild symbol 408 in that position. As shown in FIG. 4F, this evaluation may be accompanied by one or more spin animations 414 that occur in each matrix position being evaluated. Spin animations 414 may include an overlay reel spin for each matrix position being evaluated, in which the overlay reel includes a combination of wild symbols 408 and blank spaces.

For each matrix position being evaluated, a respective lookup table may be evaluated with respect to an RNG call. Similar to the determination made during the base game, the lookup tables may be weighted based on where and/or how many wild symbols 408 and/or combined wild symbols 410 are currently displayed in matrix 402. For example, if a greater number of wild symbols 408 are currently displayed, a weighting factor that reduces a likelihood of additional wild symbols 408 being displayed may be applied to the lookup tables. This weighting may be determined separately for each matrix position being evaluated. For example, a lookup table may be weighted based on how many wild symbols 408 are displayed in the corresponding row 404 and/or column 406. Accordingly, this weighting may be used to control RTP of the respin feature by defining a likelihood that additional wild symbols 408 are displayed in a given matrix position for a particular game instance of the respin feature.

In matrix positions where it is determined to generated a new wild symbol 408 based on this evaluation, the new wild symbol 408 may be displayed in the matrix position replacing any symbol that was previously displayed in the same matrix position. In matrix positions where it is determined not to generate a new wild symbol 408, any symbol currently displayed in the matrix position may remain displayed or may be replaced with a blank space or other non-wild symbol. After each game instance of the respin feature, the number of free spin credits may be decremented, and the respin feature may terminate once the number of free spin credits reaches zero. In some embodiments, certain in-game events may trigger an award of additional free spin credits, extending the respin feature. For example, in some embodiments, whenever a new wild symbol 408 is generated, the number of free spins is incremented and/or reset (e.g., to three).

Figure 4I:
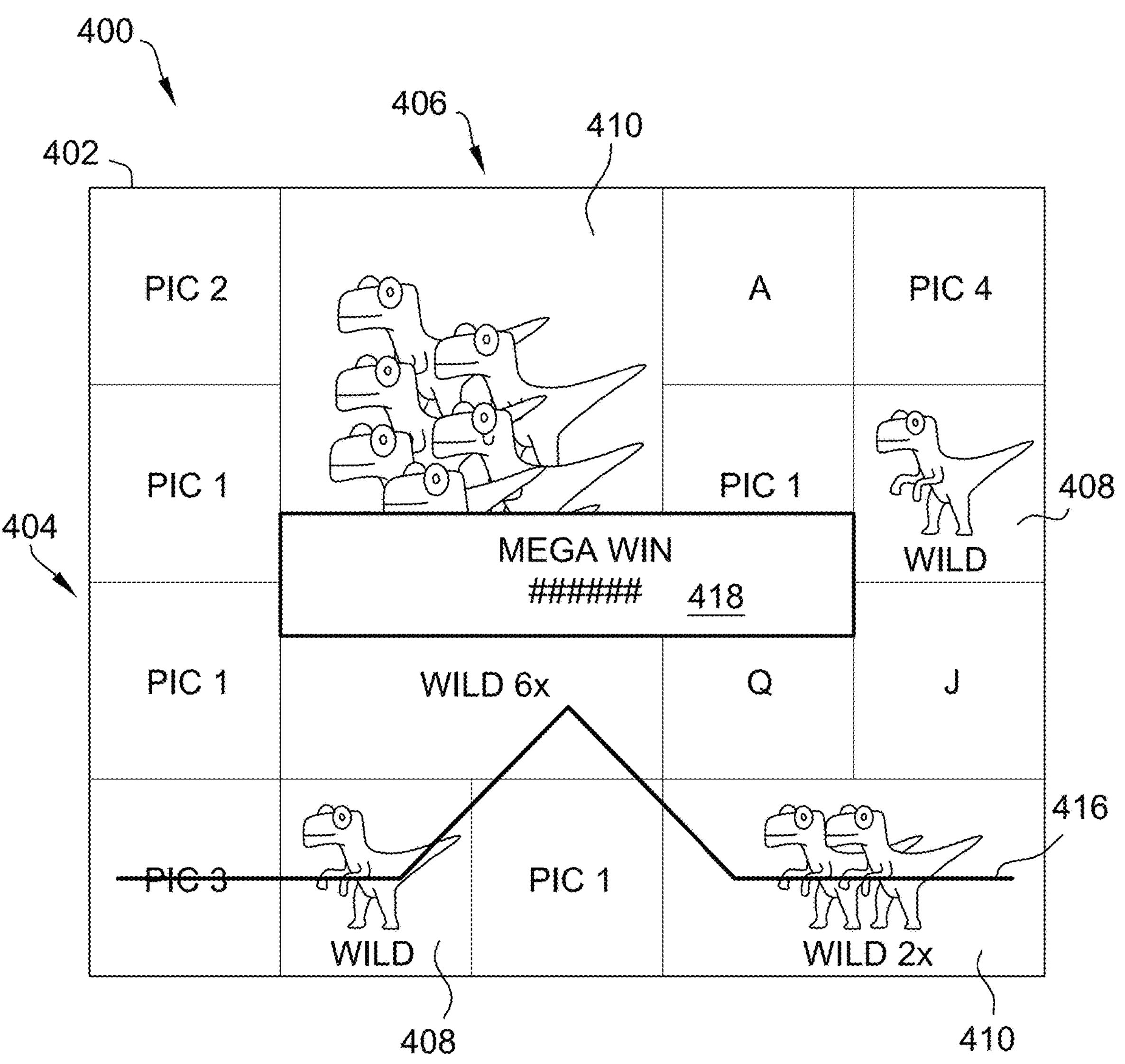

Certain combinations including wild symbols 408 and/or combined wild symbols 410 may form winning patterns as defined by a pay table. For example, as shown in FIG. 4I, a winning pattern may be completed based on one or more wild symbols 408 or combined wild symbols 410 being displayed in a line 416. A win indicator 418 may be displayed when a winning pattern occurs to inform the user. A credit amount associated with the win (e.g., determined by the pay table and any applicable multipliers) may be credited to a player credit balance.

Figure 4J:
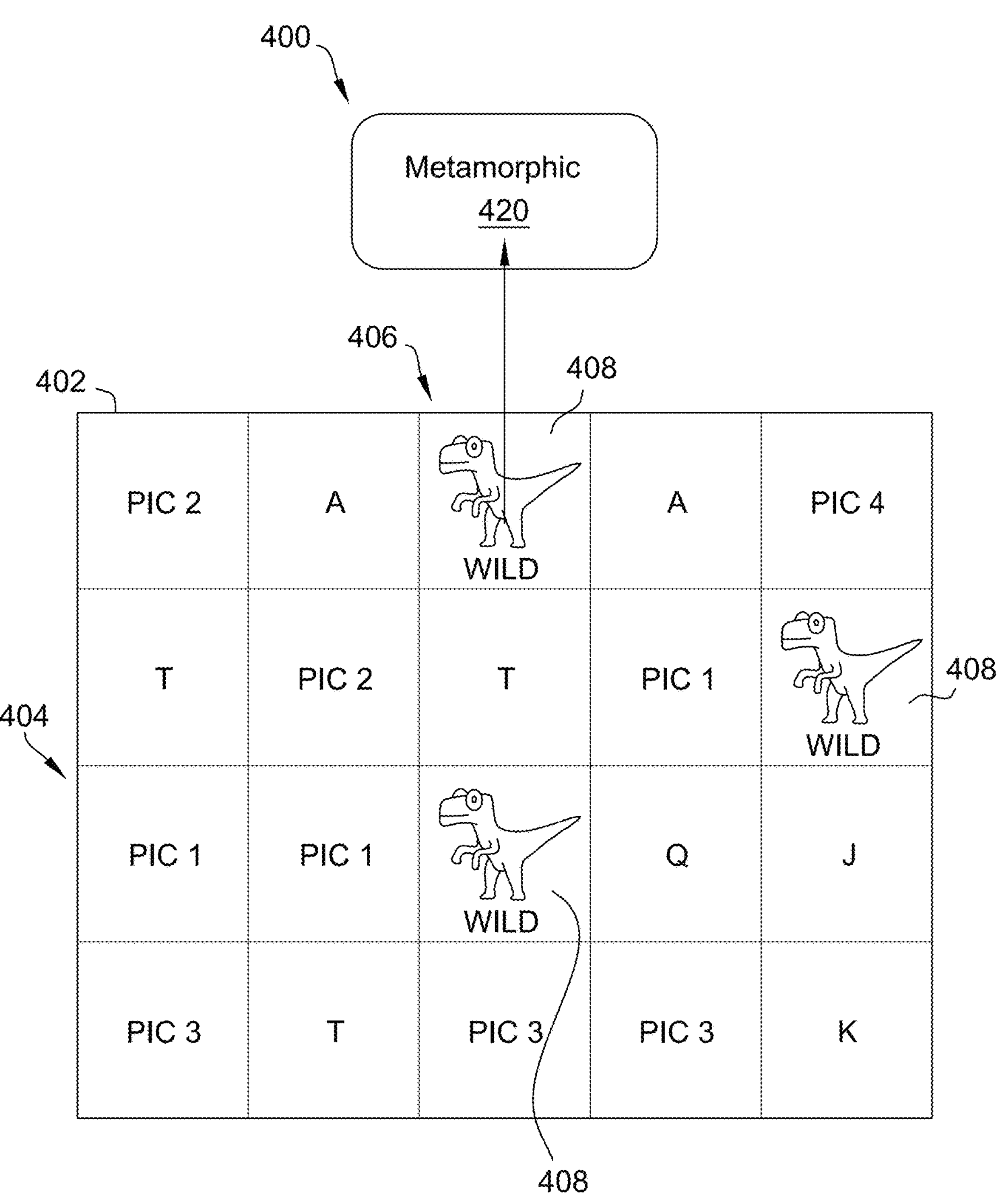
Figure 4K:
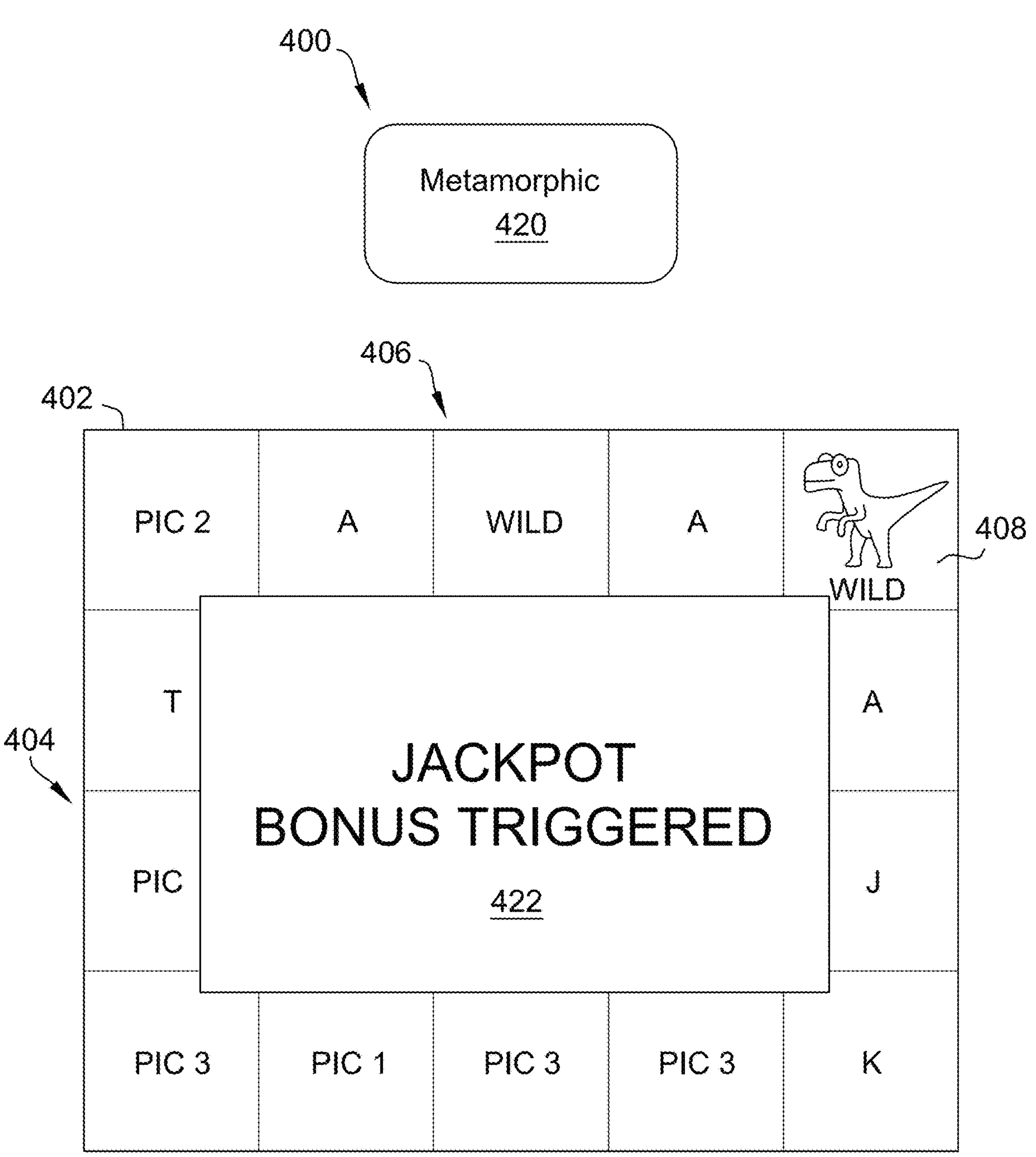

Referring to FIGS. 4J and 4K, in some embodiments, game interface 400 further includes metamorphic image 420. As described above, as game instances occur, wild symbols 408 progress or advance upward through matrix 402. When wild symbols 408 are displayed in a top row 404 of matrix 402, for the following game instance, these wild symbols 408 are removed from matrix 402, because there are no further rows 404 to which these wild symbols 408 may progress. When one or more wild symbols 408 are removed due to reaching the top of matrix 402, metamorphic image 420 may be modified. For example, in embodiments where wild symbols 408 include a dinosaur icon as shown in FIGS. 4A-4K, metamorphic image 420 may include a group of dinosaurs congregating, with an additional dinosaur added for each wild symbol 408 that reaches the top of matrix 402. An accompanying animation may show, for example, the icons moving from the wild symbols 408 at the top of matrix 402 to metamorphic image 420. In some embodiments, game interface 400 may include a counter or other indicator of how many wild symbols 408 have reached the top of matrix 402 in addition or alternative to metamorphic image 420.

Additional features may be triggered in response to at least one wild symbol 408 reaching the top of matrix 402 and/or metamorphic image 420 being modified. For example, if at least a threshold number (e.g., one) wild symbol 408 has reached the top of matrix 402, a bonus RNG call may be enabled for each game instance, and additional features may be triggered in response to the bonus RNG call. In some embodiments, the probability of such additional features being triggered by the bonus RNG call once the threshold number is reached may be fixed and/or predetermined. Alternatively, the probability may change (e.g., increase), as more wild symbols 408 reach the top of matrix 402 and metamorphic image 420 is further modified. When an additional feature is triggered, an indicator 422 may be displayed to notify the user, as shown in FIG. 4K, and the metamorphic image reset to an initial state.

FIG. 5 is a flowchart illustrating an example process 500 for a persistence feature. Process 500 may include determining 502 a weighting factor for each matrix position of matrix 402. The weighting factors may define a probability of a symbol (e.g., a wild symbol 408) of being displayed in a particular matrix position and may be determined based on, for example, a number of wild symbols 408 currently displayed and/or current locations (i.e., which rows 404, columns 406, and/or matrix positions) in which wild symbols 408 are (or are not) displayed. As described above, the weighting factors may be further determined based on other factors, such as how recently wild symbols 408 were generated in a particular column 406, and may be selected to reduce or control an RTP of the base game and/or respin feature by controlling how frequently wild symbols 408 are displayed.

Process 500 may further include performing 504 a lookup in a respective lookup table for each matrix position of matrix 402 (or each matrix position in which a wild symbol 408 or combined wild symbol 410 is not already displayed) based on an RNG call, and generating a wild symbol 408 in one or more of the matrix positions based on the respective lookups and on the weighting factors corresponding to the matrix positions. In some embodiments, separate lookup tables are used for each matrix position (e.g., based on their respective row 404 and/or column 406), such that different rows 404 and/or columns 406 may have different probabilities of displaying a wild symbol 408. These probabilities may be selected to control RTP while providing a greater variety of possible game outcomes. In some embodiments, determining 502 the weighting factor, performing 504 the lookup for each matrix position, and/or generating wild symbols 408 (e.g., as part of an instance of the respin feature) may be performed repeatedly. For example, the game instance of the respin feature may be performed again if a number of spin credits is greater than zero, and the number of spin credits may be decremented after each game instance. The base game may resume when zero spin credits associated with the respin feature remain.

Process 500 may further include, for each currently displayed wild symbol 408, advancing 508 the currently-displayed wild symbol 408 to a matrix position above and adjacent to a the current matrix position in which the wild symbol 408 is displayed. In other words, for each game instance (e.g., of the base game), wild symbols 408 displayed in matrix 402 may progress or advance upward within a column 406 to a matrix position in the next adjacent row 404.

Process 500 may further include displaying 510 a combined wild symbol 410 in at least two adjacent matrix positions in which wild symbols 408 are displayed. As described above, combined wild symbols 410 may each be associated with a multiplier (e.g., corresponding to a size or number of matrix positions covered by the combined wild symbol 410). When multiple combinations are possible, rules may be executed to determine which wild symbols 408 to combine. As described above, these rules may be configured to control RTP of the persistence feature by, for example, reducing the overall multiplier (e.g., by favoring fewer, larger combinations of wild symbols 408).

Process 500 may further include evaluating 512 the matrix based on a pay table to determine a credit amount to credit to the user. The credit amount may depend on the locations of wild symbols 408 and/or other game symbols (e.g., patterns formed by wild symbols 408 and/or other game symbols), and on other variables such as multipliers (e.g., those associated with displayed combined wild symbols 410).

Process 500 may further include, if a wild symbol 408 was previously displayed in a top row of matrix 402, modifying metamorphic image 420. The metamorphic image may be modified further for each wild symbol 408 reaching the top of matrix 402. When metamorphic image 420 is modified, an additional RNG call may be enabled for each game instance, which may be used to trigger, for example, a jackpot award, another award, a bonus game feature, or another event.

Figure 6B:
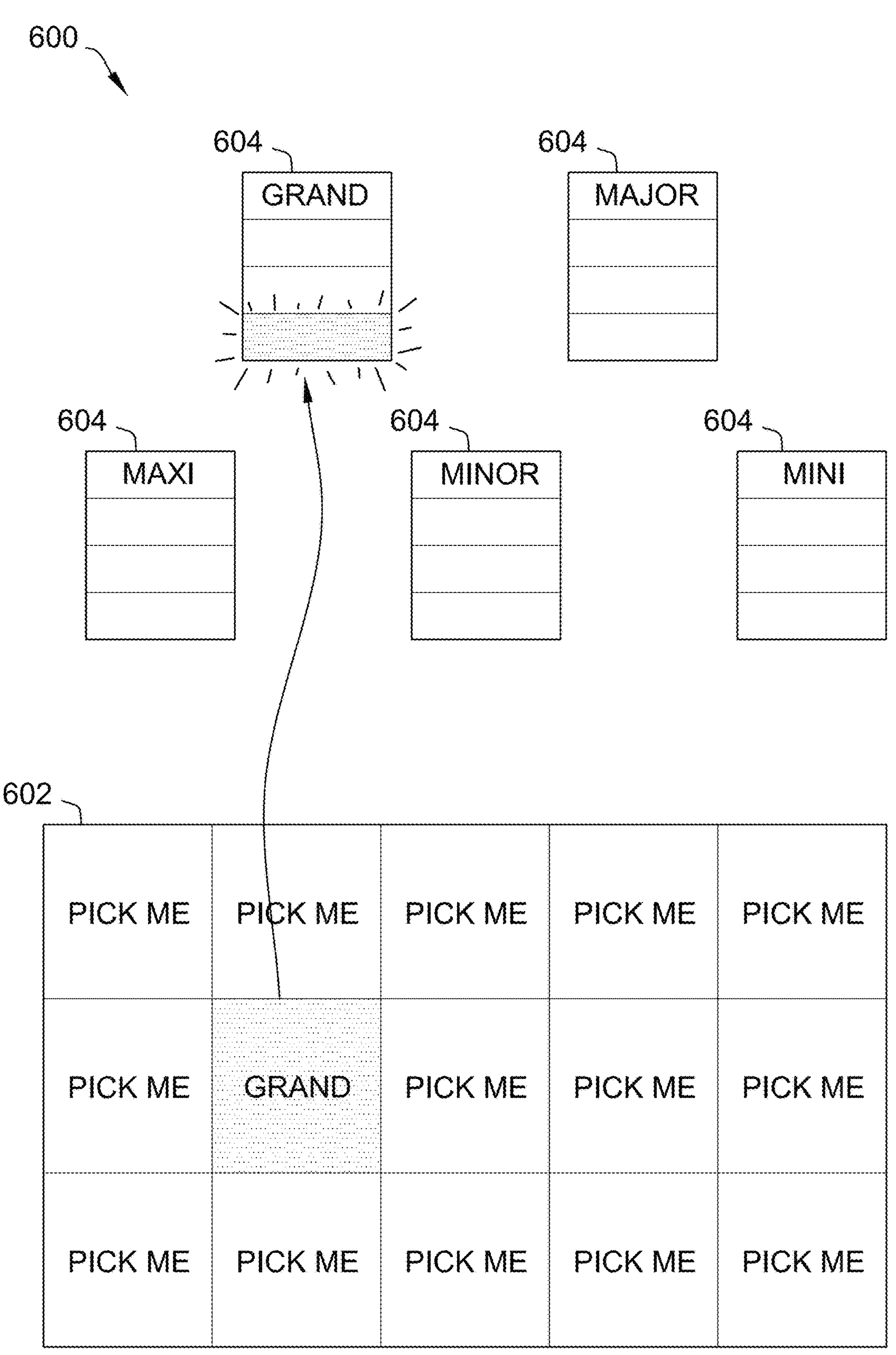

FIGS. 6A-6E depict an example game interface 600, which may be displayed by, for example, gaming devices 104A-104X and/or mobile gaming devices 256 to present, for example, a jackpot feature, which may be initiated in response to an output of the bonus RNG call described with respect to FIGS. 4J and 4K (e.g., enabled in response to a wild symbol 408 reaching a top of matrix 402 and/or a modification of metamorphic image 420). Game interface 600 may include a plurality of selectable positions 602 that may form a matrix (as shown in FIGS. 6A-6E) and/or another arrangement. Initially, as shown in FIG. 6A, each of selectable positions 602 may display, for example, an instruction (e.g., "PICK ME") for the user to select from among the selectable positions 602. The user may select, via the game interface (e.g., via a touch input), one of the selectable positions 602. As shown in FIG. 6B, this causes the selectable position 602 that was selected to change in appearance to reveal a name of one of one or more possible prize options (e.g., a mini, minor, maxi, major, or grand jackpot).

In some embodiments, the prize that associated each of selectable positions 602 may be determined upon initialization of the jackpot feature. To control a likelihood that a particular prize is awarded, some prizes may have more or less associated selectable positions 602, increasing or decreasing the likelihood that selectable positions 602 associated with the prize are selected by the user. For example, in some embodiments, prizes of lesser value may be associated with a greater number of selectable positions 602, resulting in these prizes being awarded more frequently. Alternatively, the prize associated with a selectable position 602 may be determined upon selection of the selectable position (e.g., based on a weighted RNG call).

Game interface 600 may further include one or more indicators 604 associated with each of the one or more prize options (e.g., the mini, minor, maxi, major, or grand jackpot). Each of the indicators 604 may include multiple (e.g., three) spaces. As shown in FIG. 6B, when selectable position 602 reveals a name of a prize, a space will be filled in the indicator 604 corresponding to that prize. The user may repeatedly select different selectable positions 602 to fill more spaces within the indicators 604. When each of the spaces of one of the indicators 604 is filled (as shown in FIG. 6C), the prize associated with the indicator may be credited to the user. In some embodiments, as shown in FIG. 6D, when one of the indicators 604 is filled, each of the selectable positions 602 that has not yet been selected may reveal the corresponding unselected prize name. As shown in FIG. 6E, a prize indicator 606 may be displayed indicating to the user which of the prizes is being awarded.

In some embodiments, a gaming system may include a game display configured to display a game interface including a matrix having a plurality of rows including a plurality of matrix positions. The gaming system may further include a memory device and a processor in communication with the game display and the memory device. The processor may be configured to at least (i) determine a number of wild symbols currently displayed in each matrix position in a first row of the plurality of rows the matrix, (ii) determine a weighting factor for each matrix position in the first row not currently displaying a wild symbol, based on the determined number of wild symbols, the weighting factor defining a probability for displaying a symbol in a respective matrix position, (iii) apply the determined weighting factors to respective lookup tables for each matrix position not currently displaying a wild symbol in the first row, and (iv) determine, for each matrix position in the first row, a symbol to display in each matrix position in the first row based on a lookup performed in the respective lookup tables and on at least one RNG output.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A gaming system comprising:

a game display configured to display a game interface including a matrix having a plurality of rows including a plurality of matrix positions:

a memory device storing a data structure defining (i) at least a first lookup table, the first lookup table defining a base probability of displaying one or more symbols in response to a random number generator (RNG) output, (ii) a current state of the plurality of matrix positions, the current state defining whether a first predefined symbol is present in a respective matrix position of the plurality of matrix positions, and (iii) a current number of spin credits; and a processor in communication with the game display and the memory device, the processor configured to:

determine a number of the first predefined symbols currently displayed in the matrix;

in response to determining the number of the first predefined symbols currently displayed in the matrix exceeds a threshold number, determine the current number of spin credits;

in response to the number of spin credits being greater than zero, determine, for each respective matrix position not currently displaying one of the first predefined symbol, a respective weighting factor based on at least one of (a) a number of the first predefined symbols currently displayed in a same column as the respective matrix position, or (b) a number of the first predefined symbols currently displayed in a same row as the respective matrix position, wherein when applied to the first lookup table, the respective weighting factor adjusts the probability for displaying a symbol in the respective matrix position from the base probability; and determine, for each matrix position not currently displaying the first predefined symbol, a symbol to display based on a respective lookup performed in the first lookup table and on at least one RNG output, wherein the respective weighting factor is applied to the first lookup table during the respective lookup to control a probability for displaying the symbol.

2. The gaming system of claim 1, wherein determining the symbol to be displayed in each matrix position based on the respective lookup reduces repetition of display outcomes to increase a variability of the display outcomes achievable using a given number of lookup tables without increasing an amount of data needed to be stored in the memory device.

3. The gaming system of claim 1, wherein the processor is further configured to in response to determining the symbol to display for each matrix position not currently displaying the first predefined symbol, decrement the current number of spin credits stored in the memory device.

4. The gaming system of claim 1, wherein the processor is further configured to, in response to determining to display at least one of the first predefined symbol, increment the current number of spin credits stored in the memory device.

5. The gaming system of claim 1, wherein the processor is further configured to cause the game display to advance the first predefined symbols currently displayed in the matrix within a respective column to an adjacent matrix position in an adjacent row.

6. The gaming system of claim 1, wherein the processor is further configured to:

evaluate the matrix based at least on a pay table and on which matrix positions of the matrix display the first predefined symbol to determine a credit amount; and credit the determined credit amount to a player credit balance.

7. The gaming system of claim 6, wherein the processor is further configured to:

determine at least two of the first predefined symbols are displayed in a plurality of adjacent matrix positions; and display a combined first predefined symbol in at least two adjacent matrix positions of the plurality of adjacent matrix positions.

8. The gaming system of claim 7, wherein the processor is further configured to:

determine a multiplier based at least in part on a number of matrix positions in which the combined first predefined symbol is displayed; and apply the multiplier to the credit amount credited to the player credit balance.

9. The gaming system of claim 1, wherein the game interface further includes a metamorphic image, and wherein the processor is further configured to:

determine at least one of the first predefined symbol is displayed in a top row of the plurality of rows;

in response to the determination that the at least one of the first predefined symbol is displayed in the top row, modify the metamorphic image;

in response to the metamorphic image being modified, perform a bonus RNG call; and trigger at least one additional game feature based on an output of the bonus RNG call.

10. A method performed by a gaming system including a game display configured to display a game interface including a matrix having a plurality of rows including a plurality of matrix positions, a memory device storing a data structure defining (i) at least a first lookup table, the first lookup table defining a base probability of displaying one or more symbols in response to a random number generator (RNG) output, (ii) a current state of the plurality of matrix positions, the current state defining whether a first predefined symbol is present in a respective matrix position of the plurality of matrix positions, and (iii) a current number of spin credits:

determining a number of the first predefined symbols currently displayed in the matrix;

in response to determining the number of the first predefined symbols currently displayed in the matrix exceeds a threshold number, determining the current number of spin credits;

in response to the number of spin credits being greater than zero, determining, for each respective matrix position not currently displaying the first predefined symbol, a respective weighting factor based on at least one of (a) a number of the first predefined symbols currently displayed in a same column as the respective matrix position, or (b) a number of the first predefined symbols currently displayed in a same row as the respective matrix position, wherein when applied to the first lookup table, the respective weighting factor adjusts the probability for displaying a symbol in the respective matrix position from the base probability; and determining, for each matrix position not currently displaying the first predefined symbol, a symbol to display based on a respective lookup performed in the first lookup table and on at least one RNG output, wherein the respective weighting factor is applied to the first lookup table during the respective lookup to control a probability for displaying the symbol.

11. The method of claim 10, wherein the symbol that is determined to be displayed based on the respective lookup is an additional one of the first predefined symbol.

12. The method of claim 10, further comprising, in response to determining the symbol to display for each matrix position not currently displaying the first predefined symbol, decrementing the current number of spin credits stored in the memory device.

13. The method of claim 10, further comprising, in response to determining to display at least one of the first predefined symbol, incrementing the current number of spin credits stored in the memory device.

14. The method of claim 10, further comprising causing the game display to advance the first predefined symbols currently displayed in the matrix within a respective column to an adjacent matrix position in an adjacent row.

15. The method of claim 10, further comprising:

evaluating the matrix based at least on a pay table and on which matrix positions of the matrix display the first predefined symbol to determine a credit amount; and crediting the determined credit amount to a player credit balance.

16. The method of claim 15, further comprising:

determining at least two of the first predefined symbols are displayed in a plurality of adjacent matrix positions; and displaying a combined first predefined symbol in at least two adjacent matrix positions of the plurality of adjacent matrix positions.

17. The method of claim 16, further comprising:

determine a multiplier based at least in part on a number of matrix positions in which the combined first predefined symbol is displayed; and apply the multiplier to the credit amount credited to the player credit balance.

18. The method of claim 10, wherein the game interface further includes a metamorphic image, and wherein the method further comprises:

determining at least one first predefined symbol is displayed in a top row of the plurality of rows;

in response to the determination that at least one first predefined symbol is displayed in the top row, modifying the metamorphic image;

in response to the metamorphic image being modified, performing a bonus RNG call; and triggering at least one additional game feature based on an output of the bonus RNG call.

19. At least one non-transitory computer-readable media having computer-executable instructions embodied thereon, wherein when executed by a processor in communication with a game display configured to display a game interface including a matrix having a plurality of rows including a plurality of matrix positions and a memory device storing a data structure defining (i) at least a first lookup table, the first lookup table defining a base probability of displaying one or more symbols in response to a random number generator (RNG) output, (ii) a current state of the plurality of matrix positions, the current state defining whether a first predefined symbol is present in a respective matrix position of the plurality of matrix positions, and (iii) a current number of spin credits:

determine a number of the first predefined symbols currently displayed in the matrix;

in response to determining the number of the first predefined symbols currently displayed in the matrix exceeds a threshold number, determine the current number of spin credits stored in the memory device;

in response to the number of spin credits being greater than zero, determine, for each respective matrix position not currently displaying the first predefined symbol, a respective weighting factor based on at least one of (a) a number of the first predefined symbols currently displayed in a same column as the respective matrix position, or (b) a number of the first predefined symbols currently displayed in a same row as the respective matrix position, wherein when applied to the first lookup table, the respective weighting factor adjusts the probability for displaying a symbol in the respective matrix position from the base probability; and determine, for each matrix position not currently displaying the first predefined symbol, a symbol to display based on a respective lookup performed in the first lookup table and on at least one RNG output, wherein the respective weighting factor is applied to the first lookup table during the respective lookup to control a probability for displaying the symbol.

20. The at least one non-transitory computer-readable storage media of claim 19, wherein the symbol determined to be displayed based on the respective lookup is an additional one of the first predefined symbol.

* * * * *